United States Patent [19]
Higurashi

[11] Patent Number: 5,642,457
[45] Date of Patent: Jun. 24, 1997

[54] HELICAL SCAN TYPE MAGNETIC RECORDING AND REPRODUCING APPARATUS

[75] Inventor: Seiji Higurashi, Fuchu, Japan

[73] Assignee: Victor Company of Japan, Ltd., Yokohama, Japan

[21] Appl. No.: 540,086

[22] Filed: Oct. 6, 1995

[30] Foreign Application Priority Data

Oct. 7, 1994 [JP] Japan .................................. 6-270692

[51] Int. Cl.[6] ................. H04N 9/79; H04N 5/91
[52] U.S. Cl. ................. 386/35; 386/108; 386/96; 360/18
[58] Field of Search .................... 358/335, 310, 358/341, 343; 360/19.1, 18; 386/35, 40, 108, 95, 96

[56] References Cited

U.S. PATENT DOCUMENTS

| | | | |
|---|---|---|---|
| 4,963,991 | 10/1990 | Honjo | 358/310 |
| 5,128,775 | 7/1992 | Suziki et al. | 358/343 |
| 5,394,275 | 2/1995 | Itetani et al. | 360/35.1 |
| 5,414,566 | 5/1995 | Oba et al. | 360/13 |

*Primary Examiner*—Tommy P. Chin
*Assistant Examiner*—David R. Vincent
*Attorney, Agent, or Firm*—Michael N. Meller

[57] ABSTRACT

A helical scan type magnetic recording and reproducing apparatus records/reproduces a video signal and a audio signal on/from tracks formed on a magnetic tape obliquely with respect to a longitudinal direction of a magnetic tape wound on a rotary drum. When a multiplexed signal containing a frequency modulated luminance signal and a low frequency converted chrominance signal and a frequency modulated audio signal which are related to an analog video signal are recorded/reproduced, the rotary drum is rotated in synchronism with a frame pulse of the analog video signal. When a digital video signal is recorded/reproduced, the rotary drum is rotated at a speed 1.25 times that when an analog video signal of the NTSC system is recorded/reproduced and at a speed 1.5 times that when an analog video signal of the PAL or SECAM system is recorded/reproduced.

10 Claims, 18 Drawing Sheets

ROTATING DIRECTION

FIG.6

| MODE / HEAD | SP | EP | D1 | D2 | D3 |
|---|---|---|---|---|---|
| S1 | V | — | — | — | — |
| S2 | V | — | — | — | — |
| E1 | — | V | — | D2 | — |
| E2 | — | V | — | D2 | D3 |
| A1 | A | A | D1 | D2 | D3 |
| A2 | A | A | D1 | D2 | — |

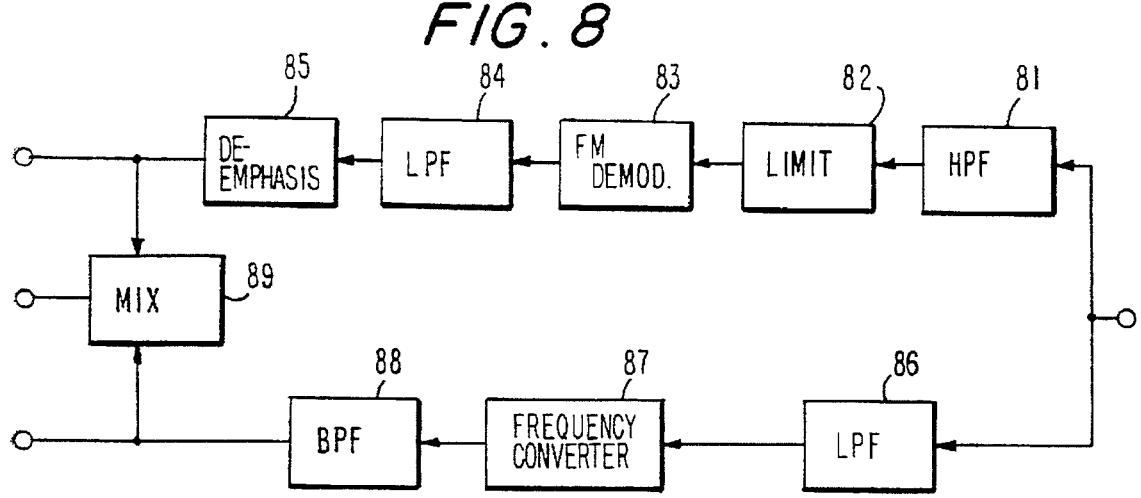
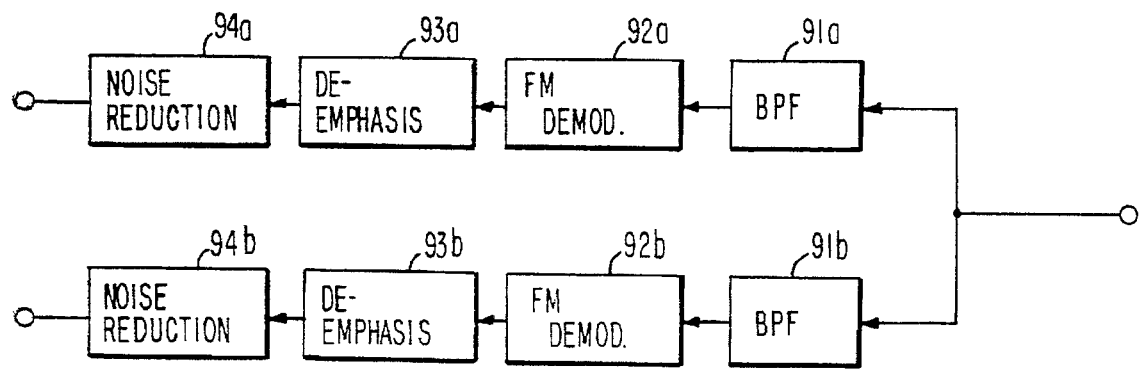

ROTATING DIRECTION

FIG. 25

| MODE / HEAD | SP | EP | D1 | D2 | D3 |
|---|---|---|---|---|---|
| S1 | V | — | — | — | — |
| S2 | V | — | — | — | — |
| E1 | — | V | — | — | — |
| E2 | — | V | — | — | — |
| A1 | A | A | — | — | — |
| A2 | A | A | — | — | — |
| H1 | — | — | D1 | D2 | D3 |
| H2 | — | — | — | D2 | — |
| H3 | — | — | D1 | D2 | — |
| H4 | — | — | — | D2 | — |

HELICAL SCAN TYPE MAGNETIC RECORDING AND REPRODUCING APPARATUS

BACKGROUND OF THE INVENTION

1. Field of the Invention

The present invention relates to a helical scan type magnetic recording and reproducing apparatus for recording and reproducing an analog video signal and a digital video signal.

2. Description of the Prior Art

When an NTSC signal and a PAL signal which are digitized in corresponding digital video tape recorders (referred to as "VTR's", hereinafter) are recorded in the same number of tracks on a magnetic tape per video signal frame, it is necessary in the conventional technology to change the recording density of the magnetic tape between the NTSC system and the PAL system and, therefore, it is necessary to provide two separate systems each including a recording circuit and a reproducing circuit. In order to solve this problem, the format of a track and the rotation speed of a drum in case of recording of the NTSC signal are made substantially equal to those in a case of recording of the PAL signal by setting the number of tracks per NTSC video signal frame and the number of tracks per PAL video signal 5: 6. Digital VTR's using this system are known and practiced as those of the so-called D1 and D3 standards.

On the other hand, a system is disclosed in Japanese Patent Application Laid-open No. H5-207507 in which, in recording a digital signal, the rotation speed of drum is made twice that of an analog video signal recording.

In such digital VTR of D1 or D3 standard, the rotation speed which is twice that of the analog video signal recording is as high as 9000 r.p.m. or 4500 r.p.m. which requires a dedicated rotary drum. That is, a rotary drum of a home use VTR which rotates at 1800 r.p.m. (for PAL or SECAM system, 1500 r.p.m. can not be used and the construction of the VTR itself becomes complicated.

Further, in the system in which the rotation speed of the rotary drum is recorded is made twice in order to record a digital signal, the tape format must be changed between the NTSC and PAL (or SECAM) signals and editing by the frame is impossible.

BRIEF SUMMARY OF THE INVENTION

An object of the present invention is to provide a helical scan type magnetic recording and reproducing apparatus capable of recording and reproducing a digital signal by using a rotary drum of a home use VTR.

Another object of the present invention is to provide a helical scan type magnetic recording and reproducing apparatus capable of recording and reproducing both an analog video signal and a digital video signal by using a home use VTR without markedly changing the rotation speed of a rotary drum of the VTR.

According to an aspect of the present invention, in order to achieve the above objects, a helical scan type magnetic recording and reproducing apparatus, which records a video signal on tracks formed on a magnetic tape obliquely with respect to a longitudinal direction of the magnetic tape wound on a rotary drum, comprises head means including a plurality of head mounted on the rotary drum, first recording and reproducing means for recording and reproducing a multiplexed signal containing a frequency modulated luminance signal and a low frequency converted chrominance signal of an analog video signal, second recording and reproducing means for recording and reproducing a digital signal composed of a digital video signal, selector means for supplying the multiplexed signal to the head means in a first mode in which the multiplexed signal is recorded and reproduced and for supplying the digital signal to the head means in a second mode in which the digital signal is recorded and reproduced, and drive means for driving the rotary drum at a first rotation speed at which the rotary drum is rotated once per frame of the analog video signal in the first mode and for driving the rotary drum at a second rotation speed at which the rotary drum is rotated at a speed 1.25 times or a speed 1.5 times the first rotation speed in the second mode.

According to an aspect of the present invention, a helical scan type magnetic recording and reproducing apparatus, which records a video signal and a audio signal on tracks formed on a magnetic tape obliquely with respect to a longitudinal direction of the magnetic tape wound on a rotary drum, comprises head means including a first head and a second head mounted on the rotary drum, first recording and reproducing means for recording and reproducing a multiplexed signal containing a frequency modulated luminance signal and a low frequency converted chrominance signal of an analog video signal, second recording and reproducing means for recording and reproducing a frequency modulated audio signal, third recording and reproducing means for recording and reproducing a digital signal composed of a digital video signal and a digital audio signal, selector means for supplying the multiplexed signal to the first head and the audio signal to the second head in a first mode in which the multiplexed signal and the audio signal are recorded and reproduced and for supplying the digital signal to the first and second heads in a second mode in which the digital signal is recorded and reproduced, and drive means for driving the rotary drum at a first rotation speed at which the rotary drum is rotated once per frame of the analog video signal in the first mode and for driving the rotary drum at a second rotation speed at which the rotary drum is rotated at a speed 1.25 times the first rotation speed in the second mode.

The drive means may comprise first signal generator means for generating a first signal having frequency 1.25 times the frequency of a first frame sync signal in synchronism with the first frame sync signal related to the digital video signal, switch means for selectively outputting a second frame sync signal related to the analog video signal in the first mode and the first signal in the second mode, and synchronizing means for synchronizing an output of the switch means with a rotation phase of the rotary drum.

The third recording and reproducing means may include a 2-channel transmission path and the selector means supplies the digital signal to the first and second heads in parallel through the 2-channel transmission path.

According to another aspect of the present invention, a helical scan type magnetic recording and reproducing apparatus, which records a video signal and a audio signal on tracks formed on a magnetic tape obliquely with respect to a longitudinal direction of the magnetic tape wound on a rotary drum, comprises head means including a first head and a second head mounted on the rotary drum, first recording and reproducing means for recording and reproducing a multiplexed signal containing a frequency modulated luminance signal and a low frequency converted chrominance signal of an analog video signal, second recording and reproducing means for recording and reproducing a frequency modulated audio signal, third recording and reproducing means for recording and reproducing a digital signal composed of a digital video signal and a digital audio signal, selector means for supplying the multiplexed signal to the first head and the audio signal to the second head in a first mode in which the multiplexed signal and the audio signal are recorded and reproduced and for supplying the digital signal to the first and second heads in a second mode in which the digital signal is recorded and reproduced, and drive means for driving the rotary drum at a first rotation speed at which the rotary drum is rotated once per frame of the analog video signal in the first mode and for driving the rotary drum at a second rotation speed at which the rotary drum is rotated at a speed 1.5 times the first rotation speed in the second mode.

The drive means may comprise first signal generator means for generating a first signal having frequency 1.5 times the frequency of a first frame sync signal in synchronism with the first frame sync signal related to the digital video signal, switch means for selectively outputting a second frame sync signal related to the analog video signal in the first mode and the first signal in the second mode, and synchronizing means for synchronizing an output of the switch means with a rotation phase of the rotary drum.

The third recording and reproducing means may include a 2-channel transmission path and the selector means supplies the digital signal to the first and second heads in parallel through the 2-channel transmission path.

According to a further aspect of the present invention, a helical scan type magnetic recording and reproducing apparatus, which records a video signal and a audio signal on tracks formed on a magnetic tape obliquely with respect to a longitudinal direction of the magnetic tape wound on a rotary drum, comprises head means including a first head and a second head mounted on the rotary drum, first recording and reproducing means for recording and reproducing a first multiplexed signal containing a frequency modulated luminance signal and a low frequency converted chrominance signal of a first analog video signal, second recording and reproducing means for recording and reproducing a second multiplexed signal containing a frequency modulated luminance signal and a low frequency converted chrominance signal of a second analog video signal having a frame frequency different from the first analog signal, third recording and reproducing means for recording and reproducing a frequency modulated audio signal, fourth recording and reproducing means for recording and reproducing a first digital signal composed of a digital audio signal and a first digital video signal or a second digital signal composed of the digital audio signal and a second digital video signal having a frame frequency different from that of the first digital video signal, selector means for supplying the first multiplexed signal to the first head and the audio signal to the second head in a first mode in which the first multiplexed signal and the audio signal are recorded and reproduced, for supplying the second multiplexed signal to the first head and the audio signal to the second head in a second mode in which the second multiplexed signal and the audio signal are recorded and reproduced, for supplying the first digital signal to the first and second heads in a third mode in which the first digital signal is recorded and reproduced and for supplying the second digital signal to the first and second heads in a fourth mode in which the second digital signal is recorded and reproduced, and drive means for driving the rotary drum at a first rotation speed at which the rotary drum is rotated once per frame of the first analog video signal in the first mode, for driving the rotary drum at a second rotation speed at which the rotary drum is rotated once per frame of the second analog video signal in the second mode, for driving the rotary drum at a third rotation speed at which the rotary drum is rotated at a speed 1.25 times the first rotation speed in the third mode and for driving the rotary drum at a third rotation speed at which the rotary drum is rotated at a speed 1.5 times the second rotation speed in the fourth mode.

The drive means may comprise first signal generator means for generating a first signal having frequency 1.25 times the frequency of a first frame sync signal in synchronism with the first frame sync signal related to the digital video signal, second signal generator means for generating a second signal having frequency 1.5 times the frequency of a second frame sync signal in synchronism with the second frame sync signal related to the second digital video signal, switch means for selectively outputting a third frame sync signal related to the first and second analog video signals in the first and second modes, the first signal in the third mode and the second signal in the fourth mode, and synchronizing means for synchronizing an output of the switch means with a rotation phase of the rotary drum.

The fourth recording and reproducing means may include a 2-channel transmission path for recording and reproducing the first and second digital signals and the selector means supplies the first and second digital signals to the first and second heads in parallel through the 2-channel transmission path in the third and fourth modes.

BRIEF DESCRIPTION OF THE DRAWINGS

FIG. 6 is an illustration showing an operation of a head selector circuit;

FIG. 8 is a block diagram showing a construction of a video reproducing processor;

FIG. 9 is a block diagram showing a construction of an audio reproducing processor;

FIG. 25 is an illustration showing an operation of a head selector circuit;

DETAILED DESCRIPTION OF THE INVENTION

An embodiment of a VTR according to the present invention utilizes a mechanism of VHS system or 8 mm video system which is one of home use VTR system and is capable of recording and reproducing a format of home use VTR and being used as a digital VTR as well. That is, both an analog video information and a digital video information are recorded and reproduced by using a common mechanical system including a rotary drum and a tape loading mechanism, etc. When the digital video information is recorded and reproduced, a rotation speed of the rotary drum is set to 2250 r.p.m. and 1-channel or 2-channel recording and reproducing is performed. Therefore, a digitized NTSC signal is recorded and reproduced by using 5 tracks per frame and a digitized PAL or SECAM signal is recorded and reproduced by using 6 tracks per frame. As a result, it is possible to make the number of tracks recorded and reproduced within a unit time in the NTSC system equal to that in the PAL or SECAM system, to use a common format in 1 track and to make a frame editing (frame by frame editing) possible. Since the rotation speed of the rotary drum, 2250 r.p.m., is 1.25 times that when an analog video information of the NTSC signal is recorded and reproduced and 1.5 times that when an analog video information of the PAL or SECAM signal is recorded and reproduced, there is no problem on a magnetic tape running and thus the common use of the mechanical system becomes possible.

This VTR can operate in an SP mode in which a standard time recording and reproducing is possible, an EP mode in which a triplex time recording and reproducing is possible, a D1 mode in which a 1-channel recording and reproducing of a digital signal is possible at a first transfer rate, a D2 mode in which a 2-channel recording and reproducing of a digital signal is possible at a third transfer rate which is twice the first transfer rate and a D3 mode in which a recording and reproducing of a digital signal is possible at a second transfer rate which is a half of the first transfer rate. A main difference between the SP mode and the EP mode is in the tape running speed. In a VTR of VHS system, the tape running speed in the EP mode is one third of that in the SP mode. Therefore, a track pitch of the slanted tracks in the EP mode is one third of that in the SP mode.

Figure 1:
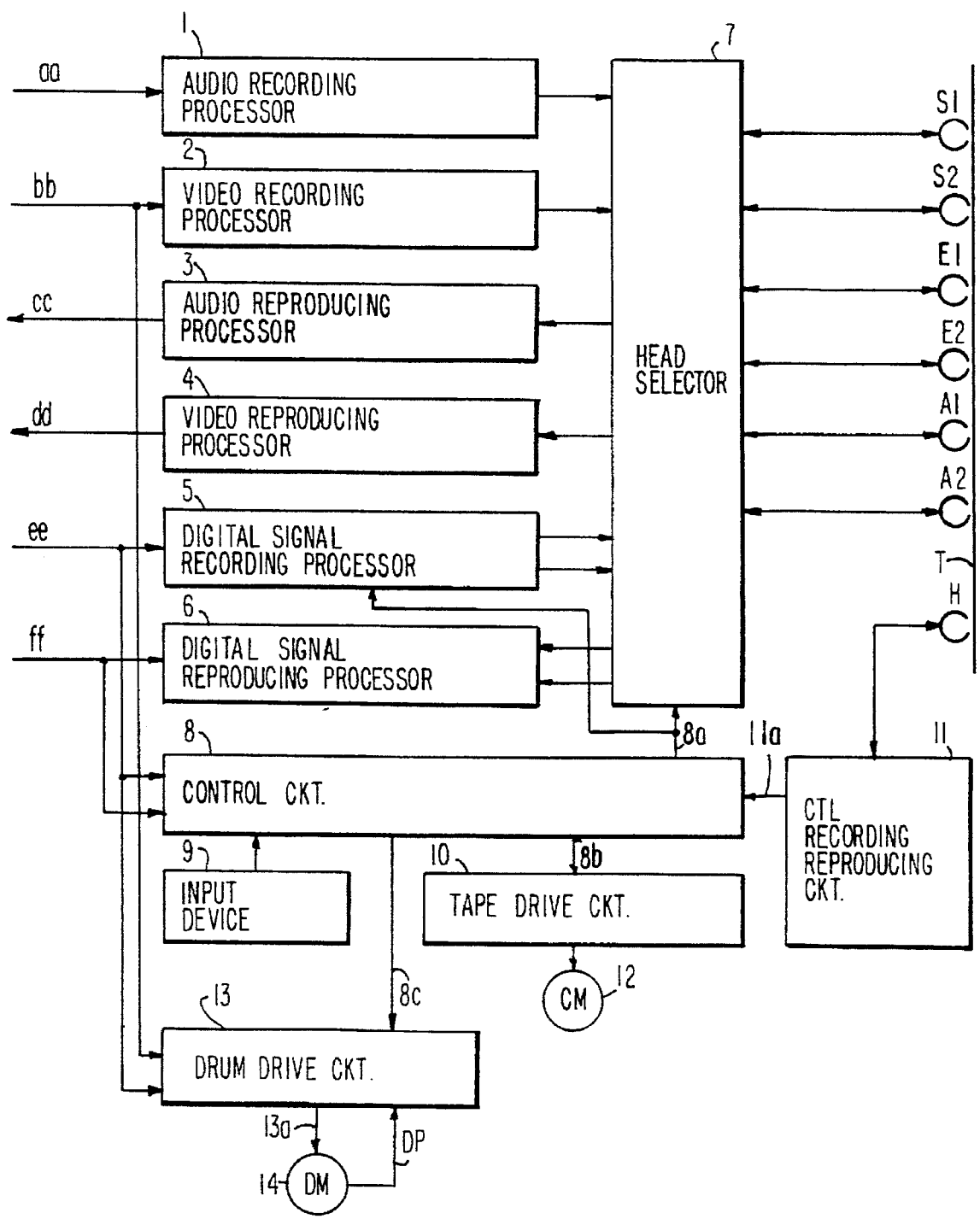
FIG. 1 shows a first embodiment of a helical scan type magnetic recording and reproducing apparatus according to the present invention.

The magnetic recording and reproducing apparatus according to first embodiment of the present invention will now be described in detail with reference to FIG. 1. In FIG. 1, in the SP mode and the EP mode in which an analog video signal and an analog audio signal are recorded and reproduced, an input audio signal aa and an input video signal bb are supplied to an audio signal recording processor 1 and a video signal recording processor 2, respectively, and, after processed thereby in suitable manners, supplied to respective heads through a head selector circuit 7 to be described later and recorded on a magnetic tape T. The recorded signals are reproduced by the respective heads and supplied to an audio signal reproducing processor 3 and a video signal reproducing processor 4 through the head selector circuit 7. From the processors 3 and 4, an output audio signal cc and an output video signal dd are obtained.

On the other hand, in the D1, D2 or D3 mode, an input digital signal ee which contains, for example, a digital video signal and a digital audio signal, etc., is supplied to a digital signal recording processor 5 and, after processed in the processor 5, supplied to the respective heads through the head selector circuit 7 and recorded on the magnetic tape T. The recorded digital signal is reproduced by the heads and supplied to the digital signal reproducing processor 6, resulting in an output digital signal ff.

Figure 2:
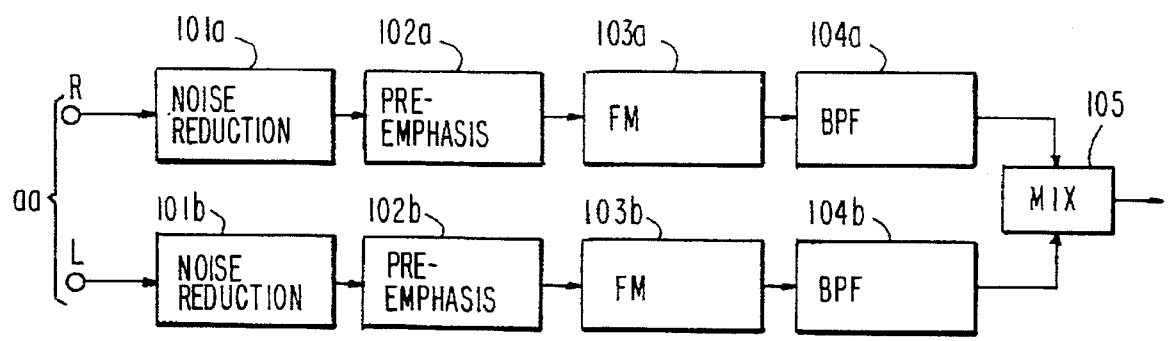
FIG. 2 is a block diagram showing a construction of an audio recording processor.

FIG. 2 is a block diagram showing a construction of the audio signal recording processor 1. In FIG. 2, audio signals of 2-channel (R, L) are passed through noise reduction circuits 101a and 101b, pre-emphasis circuits 102a and 102b to frequency modulators 103a and 103b, respectively. Carrier frequencies of the frequency modulators 103a and 103b are 1.3 MHz and 1.7 MHz, respectively. Outputs of the frequency modulators 103a and 103b are band-limited by band-pass filters (BPF's) 104a and 104b, respectively, frequency-multiplexed by a mixer 105 and supplied to the head selector 7.

Figure 3:
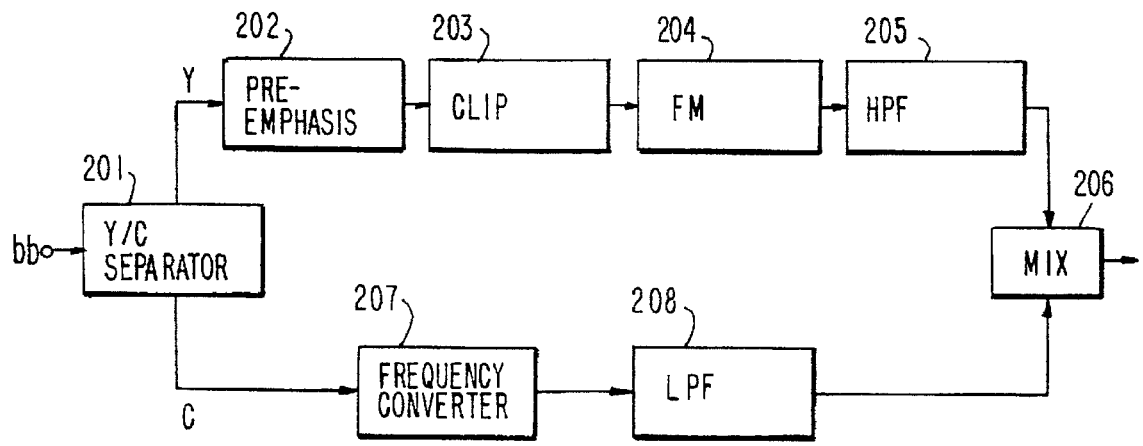
FIG. 3 is a block diagram showing a construction of a video recording processor.

FIG. 3 is a block diagram showing a construction of the video signal recording processor 2. In FIG. 3, a Y/C separator circuit 201 separates a luminance signal Y and a chrominance signal C from the input analog video signal bb. The luminance signal Y is passed through a pre-emphasis circuit 202 to emphasize a high frequency component thereof, amplitude-limited by a clip circuit 203 and frequency-modulated by a frequency modulator 204. A high-pass filter (HPF) 205 eliminates a predetermined low frequency component of the frequency modulated luminance signal and supplies it to a mixer 206.

On the other hand, the chrominance signal C from the Y/C separator 201 is frequency-converted by a frequency converter 207 such that a carrier frequency thereof becomes lower than the frequency band of the frequency modulated luminance signal. A low-pass filter (LPF) 208 eliminates a high frequency component of the frequency converted chrominance signal and supplies it to the mixer 206. The mixer 206 frequency-multiplexes the frequency modulated luminance signal and the low frequency converted chrominance signal and a resultant signal is supplied to the head selector circuit 7.

The audio signal recording processor 1 and the video signal recording processor 2 mentioned above perform substantially the same signal processing in the SP mode and the EP mode.

Figure 4:
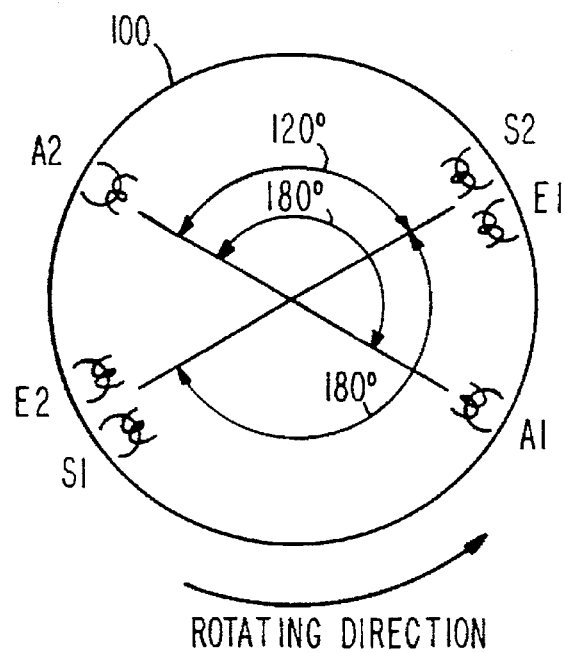
FIG. 4 shows a construction of a rotary drum.

FIG. 4 shows a construction of the rotary drum and the heads used in this embodiment. A reference numeral 100 depicts the rotary drum on which the heads are mounted. Heads S1 and S2 are used to record and reproduce a video signal in the SP mode. The heads S1 and S2 are mounted on the rotary drum in opposite positions about an axis of the drum and have azimuth angle of ±6°. Heads E1 and E2 are used to record and reproduce a video signal in the EP mode. The heads E1 and E2 are mounted on the rotary drum in opposite positions about the axis of the drum with azimuth angle of ±6° and adjacent to the heads S1 and S2, respectively. Heads A1 and A2 are used to record and reproduce an audio signal in both the SP and EP modes. The heads A1 and A2 are mounted on the rotary drum in opposite positions about the axis of the drum with azimuth angle of ±30°. The head A1 advances the head S1 by 120 and the head A2 advances the head S2 by 120.

Figure 5:
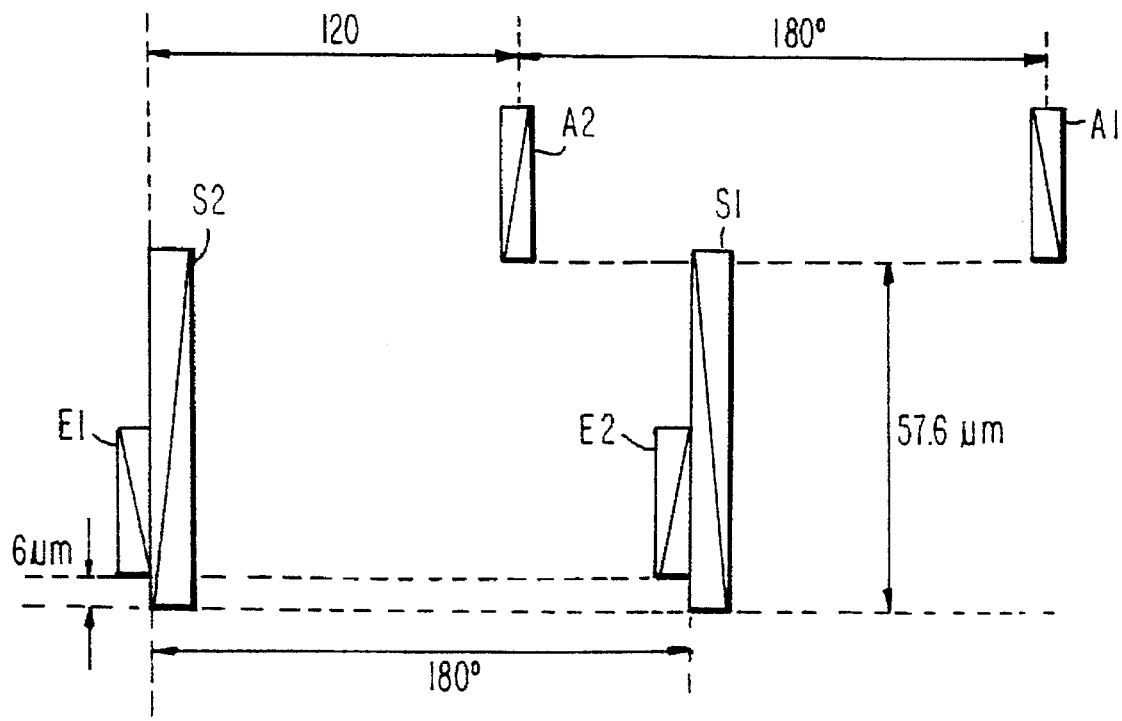
FIG. 5 is an illustration showing a mounting position of heads.

The mounting positions of the respective heads on the rotary drum are shown in FIG. 5. Lower ends of the heads E1 and E2 are positioned in a level higher than a level of lower ends of the heads S1 and S2 by 6 μm, respectively, and lower ends of the heads A1 and A2 are positioned in a level higher than the level of the lower ends of the heads S1 and S2 by 57.6 μm, respectively.

Figure 7:
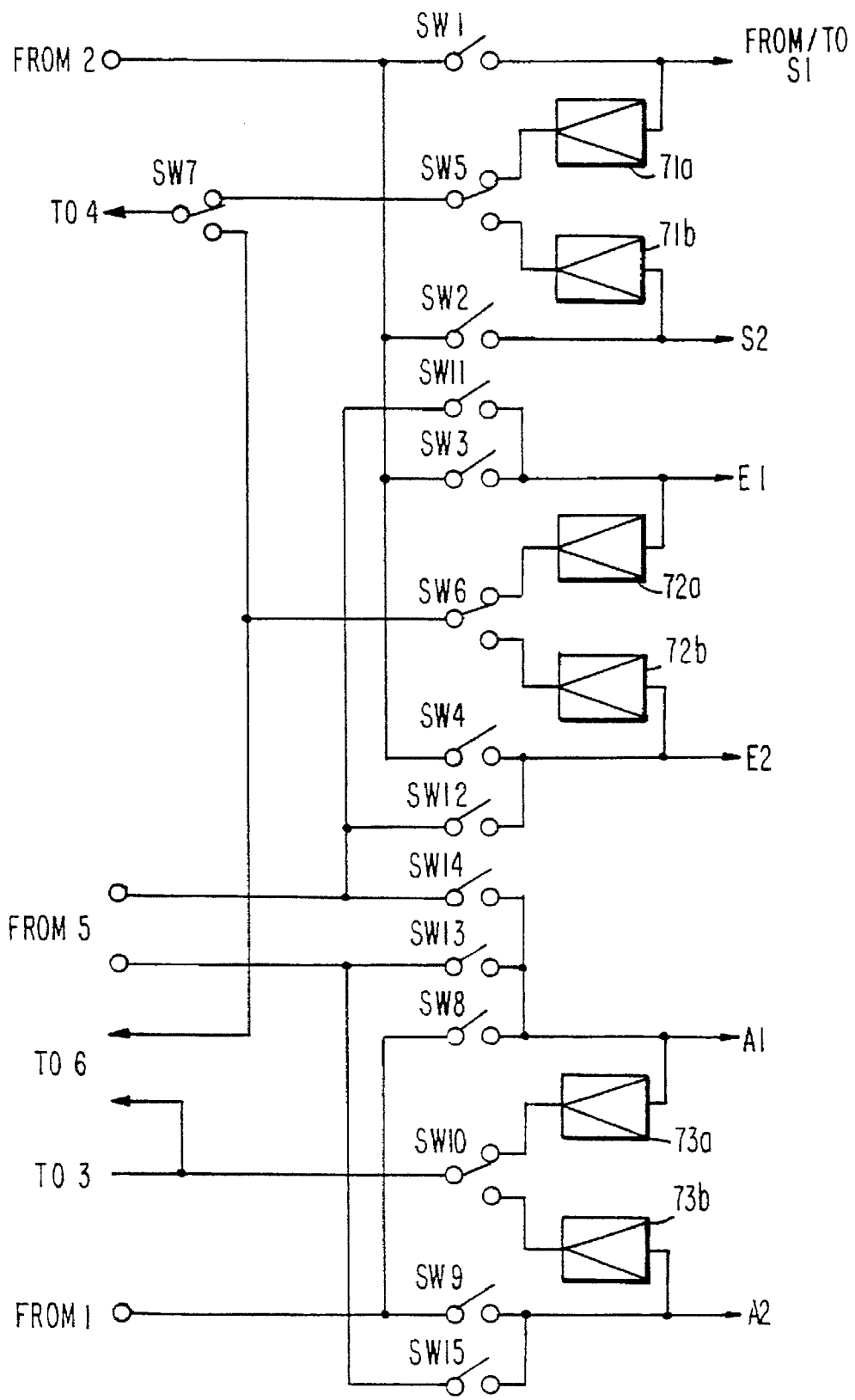
FIG. 7 is a block diagram showing a construction of the head selector circuit.

FIG. 6 illustrates an operation of the head selector circuit 7 and FIG. 7 is a block diagram of the head selector circuit 7. In FIG. 6, a capital letter "V" indicates a recording and reproducing operation for a video signal, "A" indicates a recording and reproducing operation for an audio signal and "D1", "D2" and "D3" indicate recording and reproducing operations for a digital signal in the respective D1, D2 and D3 modes.

In the SP mode, the heads A1, A2, S1 and S2 are selected by the head selector circuit 7 such that a deep recording or reproducing operation is performed. That is, after the audio signal is recorded or reproduced by using the preceding heads A1 and A2, the video signal is recorded or reproduced by using the subsequent heads S1 and S2. In detail, in the SP recording mode, switches SW8 and SW9 are turned on to supply the audio signal (the frequency modulated audio signal) from the audio signal recording processor 1 to the heads A1 and A2 to thereby record it in a deep portion of the magnetic tape. In the same mode, switches SW1 and SW2 are also turned on to supply the video signal (the multiplexed signal containing the frequency modulated luminance signal and the low frequency converted chrominance signal) from the video signal recording processor 2 to the heads S1 and S2 to thereby record it in a surface portion of the tracks on which the audio signal is recorded. In the SP video signal reproducing mode, reproducing amplifiers 71a and 71b amplify the signals reproduced by the heads S1 and S2, respectively. Outputs of the amplifiers 71a and 71b are switched by a switch SW5 in synchronism with a rotation phase of the rotary drum 100, resulting in a continuous reproduced signal. An output of the switch SW5 is supplied to the video signal reproducing processor 4 through a switch SW7.

In the EP mode, the heads A1, A2, E1 and E2 are selected by the head selector circuit 7 such that a deep recording or reproducing operation is performed. That is, after the audio signal is recorded or reproduced by using the preceding heads A1 and A2, the video signal is recorded or reproduced by using the subsequent heads E1 and E2. In detail, in the EP recording mode, switches SW8 and SW9 are turned on to supply the audio signal from the audio signal recording processor 1 to the heads A1 and A2 to thereby record it in the deep portion of the magnetic tape. In the same mode, switches SW3 and SW4 are also turned on to supply the video signal from the video signal recording processor 2 to the heads E1 and E2 to thereby record it in the surface portion of the tracks on which the audio signal is recorded. In the EP video signal reproducing mode, reproducing amplifiers 72a and 72b amplify the signals reproduced by the heads E1 and E2, respectively. Outputs of the amplifiers 72a and 72b are switched by a switch SW6 in synchronism with a rotation phase of the rotary drum 100, resulting in a continuous reproduced signal. An output of the switch SW6 is supplied to the video signal reproducing processor 4 through the switch SW7.

In reproducing the audio signal in both the SP and EP modes, reproducing amplifiers 73a and 73b amplify the signals reproduced by the heads A1 and A2, respectively. Outputs of the amplifiers 73a and 73b are switched by a switch SW10 in synchronism with a rotation phase of the rotary drum 100, resulting in a continuous reproduced signal. An output of the switch SW10 is supplied to the audio signal reproducing processor 3.

A selection of the SP mode or the EP mode during a recording operation is performed through an input device 9 manually by an operator and an output signal of the input device 9 is supplied to a control circuit 8. The control circuit 8 outputs a control signal 8a to the head selector circuit 7 on the basis of the signal from the input device 9 such that the heads are selected as shown in FIG. 6 and a control signal 8b for controlling a tape drive circuit 10. The tape drive circuit 10 drives the magnetic tape T to run at a speed one third of that in the SP mode when the control signal 8b indicates the EP mode. On the other hand, during the reproducing operation, a control head H reproduces the control signal recorded in synchronism with the input video signal bb during the recording operation. A CTL recording and reproducing circuit 11 performs a processing such as waveform shaping for an output signal of the control head H to output a reproduced control signal 11a. The control circuit 8 detects a frequency of the reproduced control signal 11a upon which it determines whether the magnetic tape under reproduction is recorded in the SP mode or the EP mode. According to the determination, the control circuit 8 produces the control signal 8b.

FIG. 8 is a block diagram showing the construction of the video signal reproducing processor 4. The output signal of the switch SW7 of the head selector circuit is supplied to a HPF 81 and a LPF 86. The frequency modulated luminance signal separated by the HPF 81 is amplitude-limited by a limiter 82 and frequency-demodulated by a frequency demodulator 83. The frequency demodulated luminance signal is passed through an LPF 84 and a de-emphasis circuit 85 to a mixer 89. On the other hand, the low frequency converted chrominance signal separated by the LPF 86 is converted into the chrominance signal having the original carrier frequency by a frequency converter 87. An output signal of the frequency converter 87 is passed through a BPF 88 to the mixer 89. The mixer 89 multiplexes the luminance signal and the chrominance signal and outputs a composite video signal. The luminance signal and the chrominance signal may be output as they are without multiplexing.

FIG. 9 is a block diagram showing the construction of the audio signal reproducing processor 3. The output signal from the switch SW10 of the head selector circuit 7 is supplied to BPF's 91a and 91b. Output signals of the BPF's 91a and 91b are passed through frequency demodulators 92a and 92b, de-emphasis circuits 93a and 93b and noise reduction circuits 94a and 94b, respectively, resulting in reproduced audio signals.

Returning to FIGS. 6 and 7, in the D1 mode, the digital signal is recorded or reproduced by selecting the heads A1 and A2 by turning switches SW14 and SW15 of the head selector circuit 7 on. It is possible to record or reproduce the digital signal by using the heads E1 and E2 having azimuth angle of ±6°. In such case, however, since the azimuth angle of the heads A1 and A2 is ±30° which is larger than that of the heads E1 and E2, it is possible to prevent cross-talk between adjacent tracks when the heads A1 and A2 are used. The D1 mode may be applied to the DBS (digital broadcasting system) having a transfer rate of 10 Mbps and using MPEG2, which has been studied in Europe. In such case, since the recording capacity per channel is set to about 14.5 Mbps by taking the D2 and D3 modes into consideration, there is a margin of 4.5 Mbps. Therefore, recording and reproducing operation is performed while inserting 0 data or other digital data into a portion corresponding to 4.5 Mbps.

In the D2 mode, the heads A1, A2, E1 and E2 are selected by on-off controlling the switches SW11, SW12, SW13 and SW15 of the head selector circuit 7 and a 2-channel simultaneous recording and reproducing operation of the digital signal is performed. The D2 mode may be applied to a digital video signal of 29 Mbps which is obtained by compressing the frequency band of the NTSC signal or the PAL/SECAM signal. In a case of the NTSC signal, the recording and reproducing operation is performed by using 5 tracks per frame and, in a case of the PAL/SECAM signal, it is performed by using 6 tracks per frame.

In the D3 mode, interval recording and reproducing operation of the digital signal is performed by selecting the heads A1 and E2 by turning switches SW12 and SW13 of the head selector circuit 7 on. The D3 mode may be applied to the DTV (digital television) having a transfer rate of 7 Mbps and using MPEG2, which has been studied in the U.S. In such case, since the recording capacity per channel is set to about 7.25 Mbps by taking the D1 and D2 modes into consideration, there is a margin of 0.25 Mbps. Therefore, recording and reproducing operation is performed while inserting 0 data or other information into a portion corresponding to 0.25 Mbps.

A construction and operation of the drum drive circuit 13 of this embodiment will be described with reference to FIGS. 10 to 16.

First, a case where the input video signal bb and the input digital signal ee are of the NTSC signal having a frame period of 30 Hz, as an example, will be described with refernce to FIGS. 10 and 11.

Figure 10:
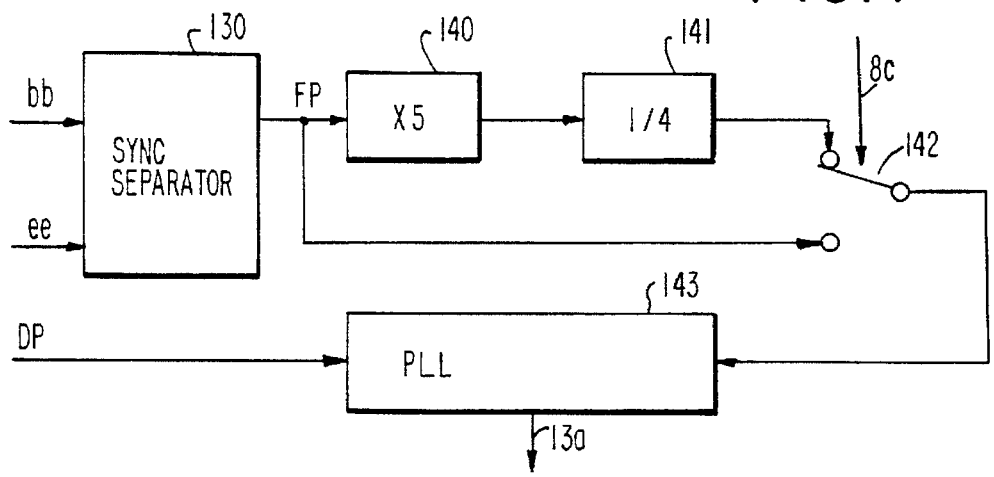
FIG. 10 is a block diagram showing a construction of a drum driving circuit.
Figure 11:
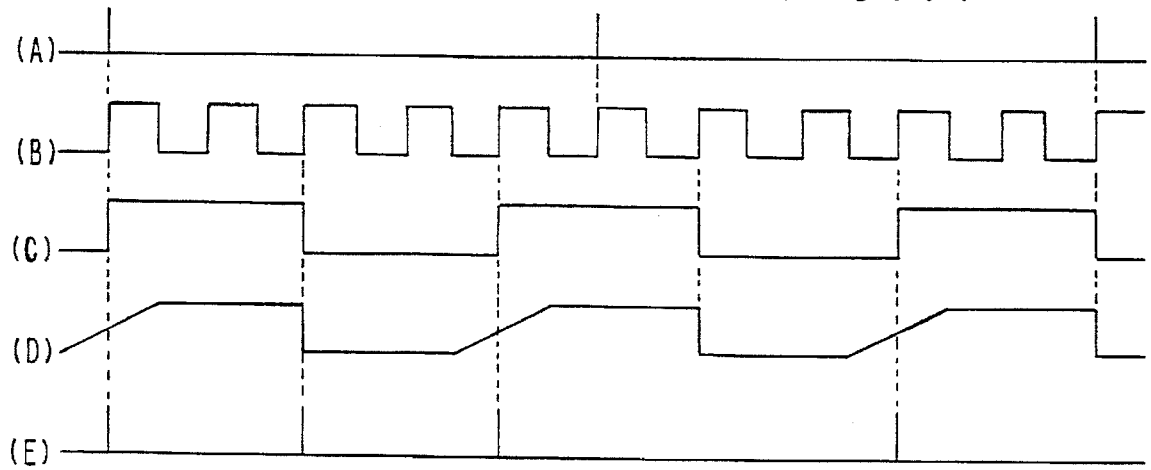
FIG. 11 is a timing chart showing an operation of the drum driving circuit.

FIG. 10 is a block diagram showing a construction of the drum drive circuit 13. In FIG. 10, the input video signal bb and the input digital signal ee are supplied to a sync separator circuit 130 of the drum drive circuit 13. The sync separator circuit 130 separates a frame pulse FP (see FIG. 11(A)) representing a frame period from the the input video signal bb and the input digital signal ee and supplies it to an input of a X5 frequency multiplier circuit 140 and one terminal of a switch circuit 142. The X5 frequency multiplier circuit 140 produces an output signal having frequency 5 times that of the frame pulse FP (see FIG. 11(B)). The signal produced by the X5 frequency multiplier circuit 140 is supplied to a ¼ frequency divider circuit 141 and a resultant output signal (FIG. 11(C)) from the ¼ frequency divider circuit 141 is supplied to the other terminal of the switch circuit 142. Thus, the output signal of the ¼ frequency divider circuit 141 has a frequency 1.25 times that of the frame pulse FP and is synchronized with the frame pulse FP.

The switch circuit 142 is controlled by a control signal 8c from the control circuit 8 and outputs the frame pulse FP when the control signal 8c indicates the SP mode or the EP mode for recording and reproducing the analog video information and the output signal of the ¼ frequency divider circuit 141 when the control signal 8c indicates the D1, D2 or D3 mode for recording and reproducing the digital video information. The output signal of the switch circuit 142 is supplied to one input of a PLL circuit 143 and compared in phase with a pulse DP (FIG. 11(E)) supplied to the other input of the PLL circuit 143, which is synchronized with the drum rotation such that one revolution of the drum corresponds to its period. A drum drive signal 13a is produced by the PLL circuit 143 when the both inputs to the latter are phase synchronized with each other. The phase comparison is performed by producing a saw tooth signal shown in FIG. 11(D) on the basis of the output of the switch circuit 142, sample-holding the saw tooth signal by the pulse DP and passing the loop filter.

As described, in the SP or EP mode, rotation frequency of the rotary drum becomes 1.25 times the frame frequency. That is, in the SP or EP mode, the rotary drum is rotated at 1800 r.p.m. and, in the D1, D2 or D3 mode, it is rotated at 2250 r.p.m.

Figure 12:
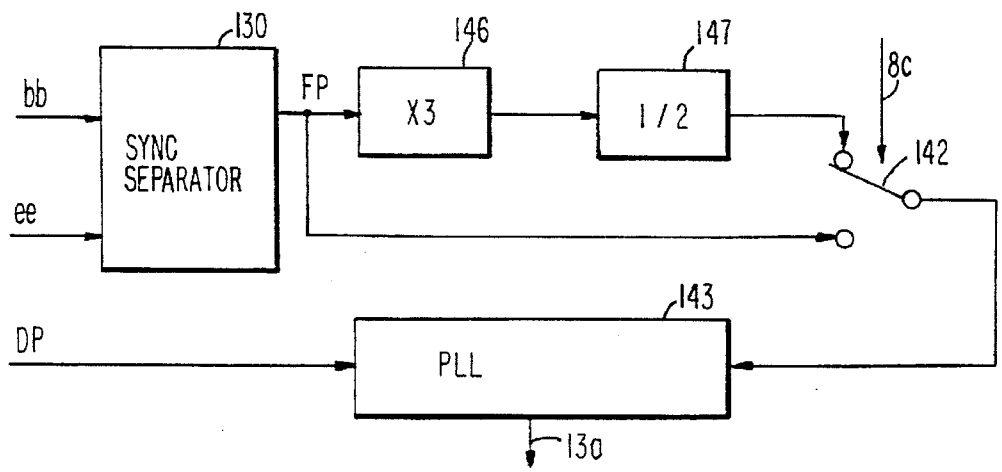
FIG. 12 is a block diagram showing another construction of the drum driving circuit.
Figure 13:
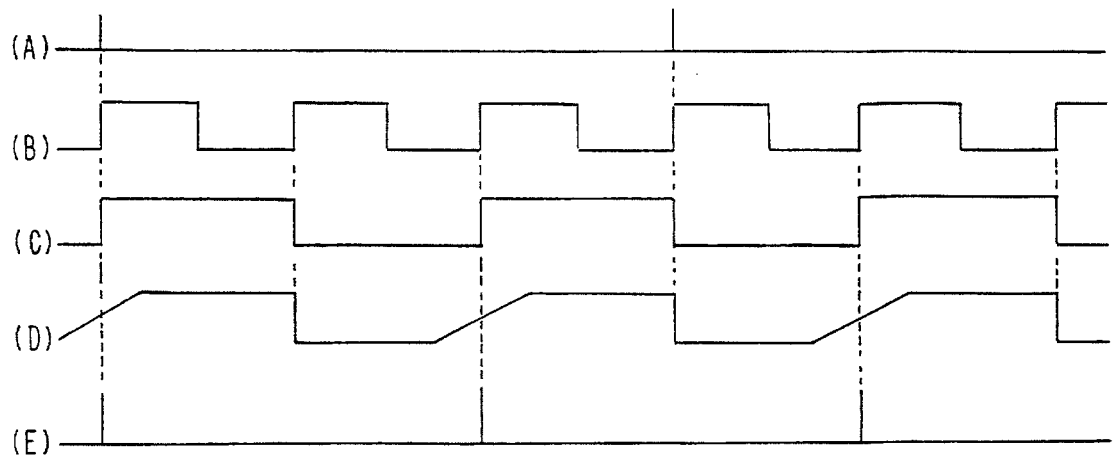
FIG. 13 is a timing chart showing an operation of the drum driving circuit.

In a case where the input video signal bb and the input digital signal ee are related to the PAL or SECAM signal having frame frequency of 25 Hz, the circuit construction of the drum drive circuit 13 is changed to that shown in FIG. 12, which differs from the drum drive circuit shown in FIG. 10 in that a X3 frequency multiplier 146 and a ½ frequency divider circuit 147 are used instead of the X5 frequency multiplier 140 and the ¼ frequency divider 141, respectively. The drum drive circuit 13 shown in FIG. 12 generates a signal (FIG. 13(C)) having frequency 1.5 times that of the frame pulse (FIG. 13(A)) and, in the D1, D2 or D3 mode, generates a drum drive signal 13a by comparing in phase a saw tooth signal (FIG. 13(D)) produced on the basis of the signal shown in FIG. 13(C) with the pulse DP (FIG. 13 (E)). As a result, the rotation speed of the rotary drum coincides with the frame frequency in the SP or EP mode and it becomes 1.5 times the frame frequency in the D1, D2 or D3 mode. That is, the drum is rotated at 1500 r.p.m. in the SP or EP mode and it is rotated at 2250 r.p.m. in the D1, D2 or D3 mode.

Figure 14:
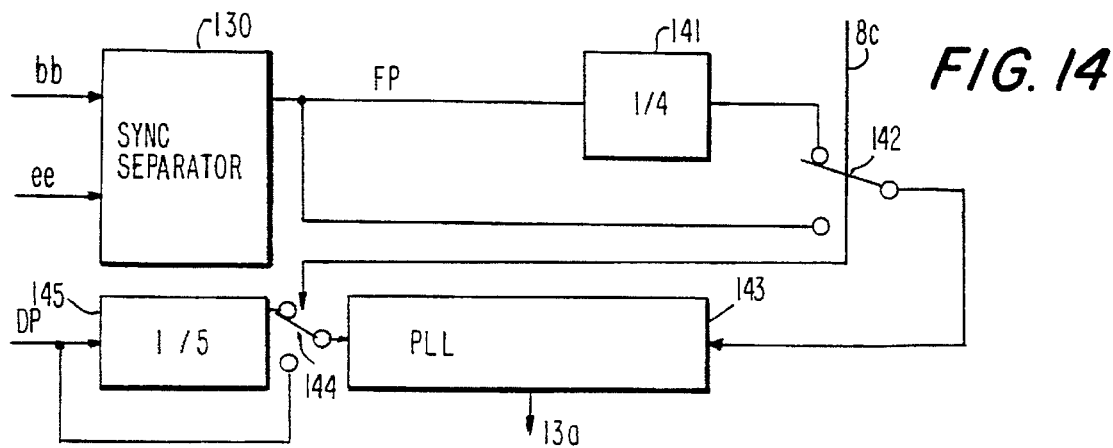
FIG. 14 is a block diagram showing another construction of the drum driving circuit.

Another embodiment of the drum drive circuit 13 will be described with reference to FIGS. 14 and 15 in which same constructive components as those shown in FIGS. 10 and 12 are depicted by same reference numerals, respectively, without details thereof. FIG. 14 shows a circuit construction of the drum drive circuit 13 in a case where the input video signal bb and the input digital signal ee are related to the NTSC signal having frame frequency of 30 Hz. In FIG. 14, in the SP or EP mode, a switch circuit 142 selects the frame pulse FP and a switch circuit 144 selects the pulse DP. A PLL circuit 143 compares a phase of the frame pulse FP with that of the pulse DP.

On the other hand, in the D1, D2 or D3 mode, the switch circuit 142 selects an output signal of a ¼ frequency divider circuit 141 which has a frequency one fourth of the frame pulse frequency. The switch circuit 144 selects an output signal of a ⅕ frequency divider circuit 145 which has a frequency one fifth of the DP pulse frequency. A PLL circuit 143 compares phases of the output signals of the switch circuits 142 and 144. The rotation of the rotary drum is controlled by an output signal of the PLL circuit as in the case of the drum drive circuit 13 shown in FIG. 10.

Figure 15:
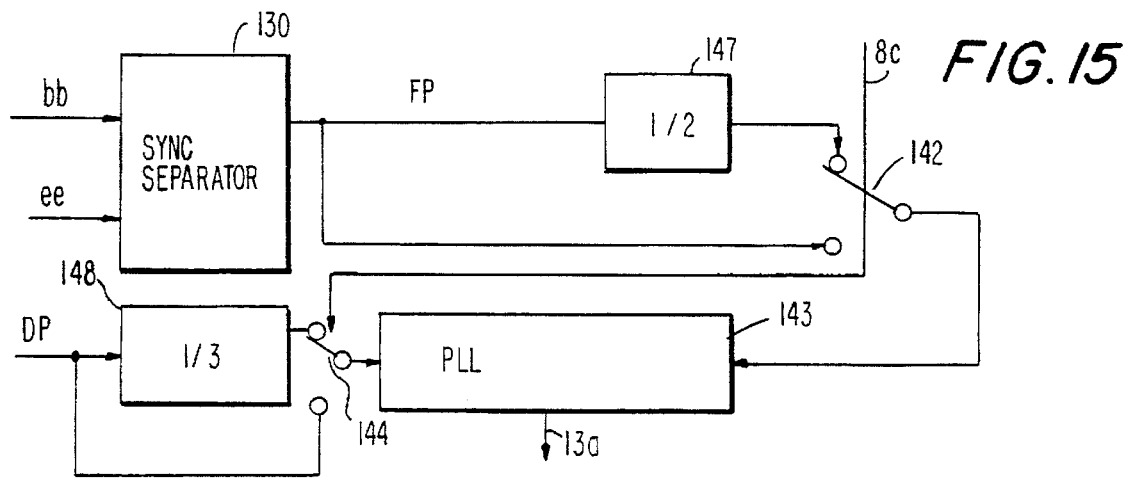
FIG. 15 is a block diagram showing another construction of the drum driving circuit.

FIG. 15 is the circuit construction of the drum drive circuit 13 in a case where the input video signal bb and the input digital signal ee are related to the PAL or SECAM signal having frame frequency of 25 Hz. The circuit shown in FIG. 15 differs from that shown in FIG. 14 in that a ½ frequency divider 147 and a ⅓ frequency divider circuit 148 are used instead of the ¼ frequency divider 141 and the ⅕ frequency divider 145, respectively.

Figure 16:
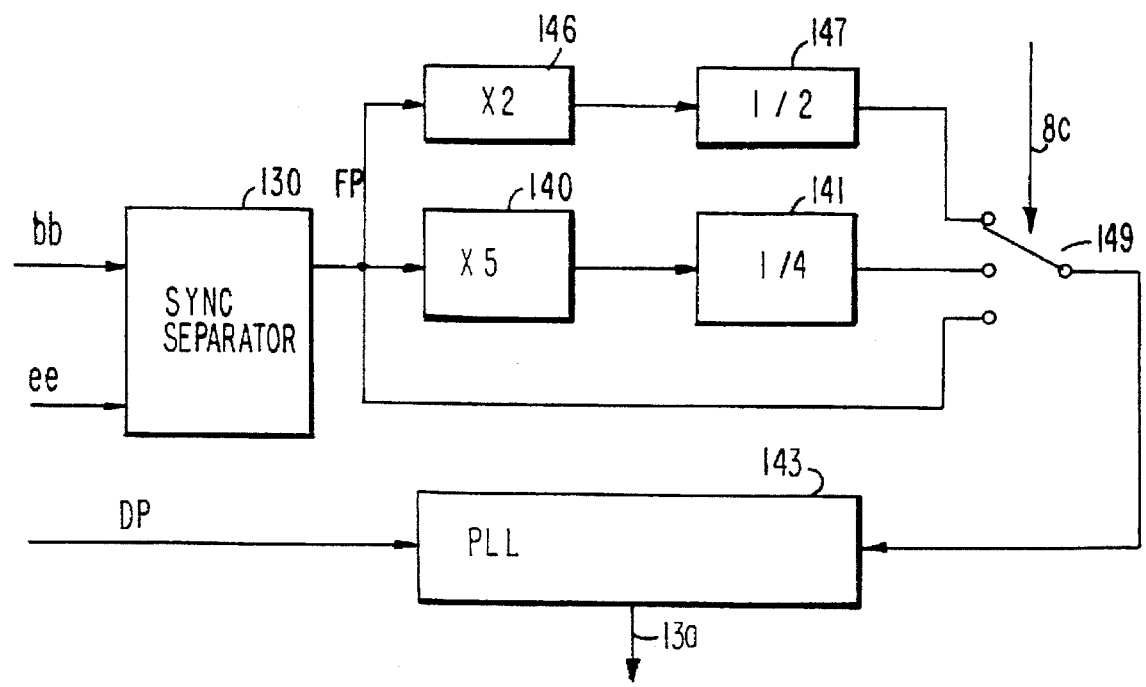
FIG. 16 is a block diagram showing another construction of the drum driving circuit.

Another embodiment of the drum drive circuit 13 will be described with reference to FIG. 16 in which same constructive components as those shown in FIGS. 10 and 12 are depicted by same reference numerals, respectively, without details thereof. The circuit shown in FIG. 16 is adaptable to the case where the input video signal bb and the input digital signal ee are of the NTSC signal having frame frequency of 30 Hz and the case where the input video signal bb and the input digital signal ee are of the PAL or SECAM signal having frame frequency of 25 Hz. In FIG. 16, in the SP or EP mode, a switch circuit 149 selects the frame pulse FP. In the D1, D2 or D3 mode, the switch circuit 149 selects an output signal of a ¼ frequency divider 141 when the input digital signal ee having frame period of 30 Hz is input and selects an output signal of a ½ frequency divider 147 when the input digital signal ee having frame period of 25 Hz is input. This selection of the output signal is performed under control of the control signal 8c from the control circuit 8.

With the construction mentioned above, the rotary drum is rotated at 1800 r.p.m. or 1500 r.p.m. in synchronism with the frame pulse of the input video signal in the SP or EP mode, that is, during the analog video signal recording and reproducing processing. The rotary drum is rotated at about 2250 r.p.m. when the input digital signal having frame frequency of 30 Hz or 25 Hz in the D1, D2 or D3 mode.

The selection of mode, D1, D2 or D3, during recording is performed by identifying an identification signal (ID information) which is inserted into the input digital signal ee and substantially represents a transfer rate by means of the control circuit 8. That is, the control circuit 8 generates control signals 8a and 8b on the basis of the identification signal. On the other hand, the selection of mode, D1, D2 or D3, during reproduction is performed by identifying an identification signal which is inserted into an output digital signal ff by means of the control circuit 8. Then, the tape drive circuit 10 drives the magnetic tape T to run at a speed which is a half of the magnetic tape running speed in the SP mode when the control signal 8b indicates the D1 mode, drives the magnetic tape T to run at the same speed as the magnetic tape running speed in the SP mode when the control signal 8b indicates the D2 mode and drives the magnetic tape T to run at a speed which is a half of the speed in the D1 mode, that is, one fourth of the magnetic tape running speed in the SP mode, when the control signal 8b indicates the D3 mode.

Figure 17:
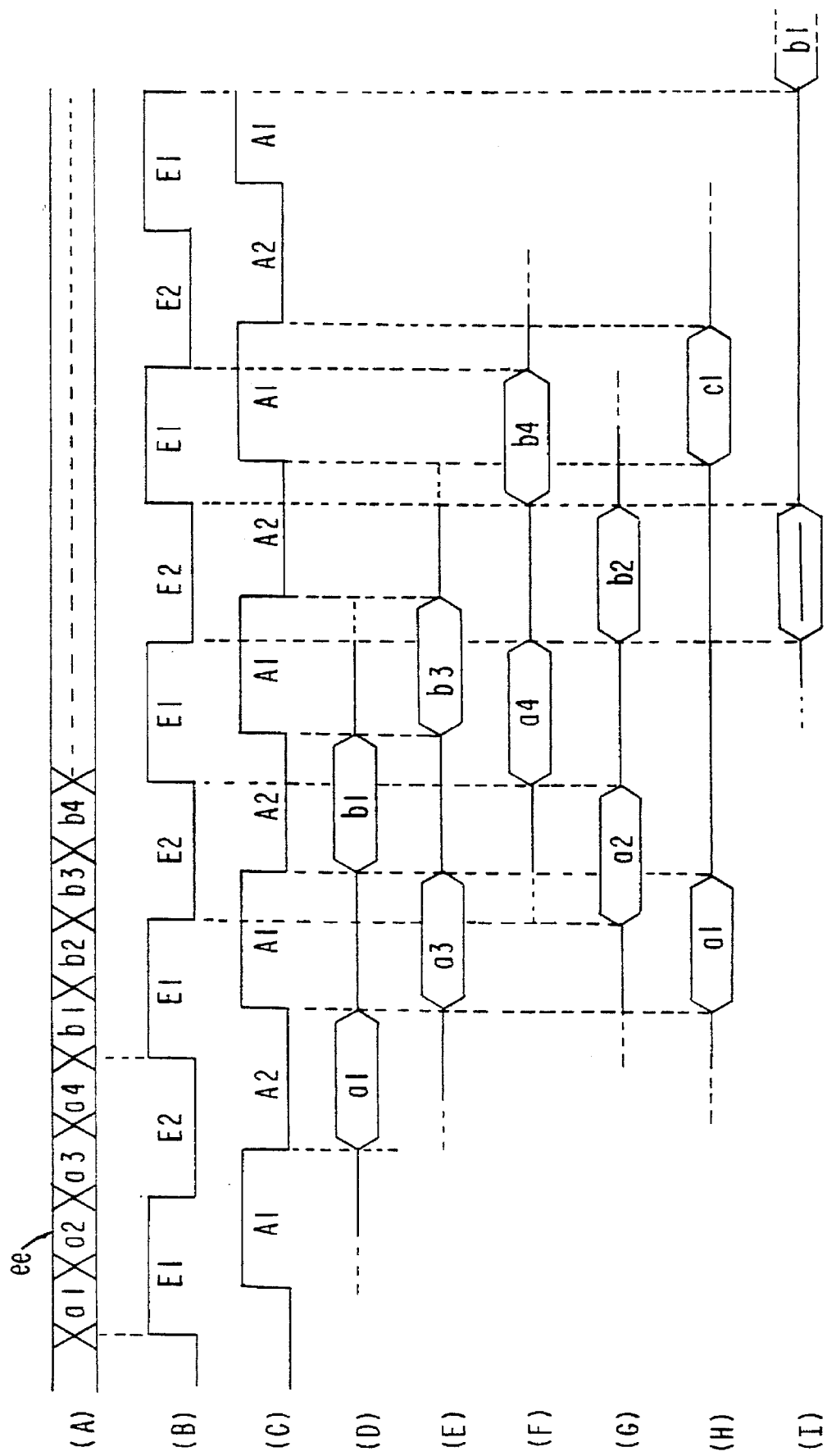
FIG. 17 is a timing chart showing an operation of a digital signal recording processing circuit.

Now, an operation of the digital signal recording processor 5 will be described with reference to FIG. 17 for a case when a digitized signal is input to the digital signal recording processor 5. FIG. 17(A) shows an input digital signal ee and FIG. 17(B) shows a pulse signal synchronized with rotation of the heads E1 and E2. In a period in which the pulse is in high level, the head E1 is in contact with the magnetic tape T and, in a period in which the pulse is in low level, the head E2 is in contact with the magnetic tape T. FIG. 17(C) shows a pulse signal synchronized with rotation of the heads A1 and A2 which are mounted on the positions of the drum preceding in phase the heads E1 and E2 by 120 degrees, respectively. In a period in which the pulse shown in FIG. 17(C) is in high level, the head A1 is in contact with the magnetic tape T and, in a period in which the pulse is in low level, the head A2 is in contact with the magnetic tape T. The input digital signal ee shown in FIG. 17(A) has a third transfer rate which is twice the first transfer rate.

In the D1 mode, data a1, b1, . . . are supplied to the head A2 in the sequence timing shown in FIG. 17(D) and data a3, b3, . . . to the head A1 in the sequence timing shown in FIG. 17(E). As a result, it is possible to perform 1-channel recording or reproduction of an information which is a half of the information of the input digital signal ee, that is, a digital signal information corresponding to the first transfer rate.

Figure 18:
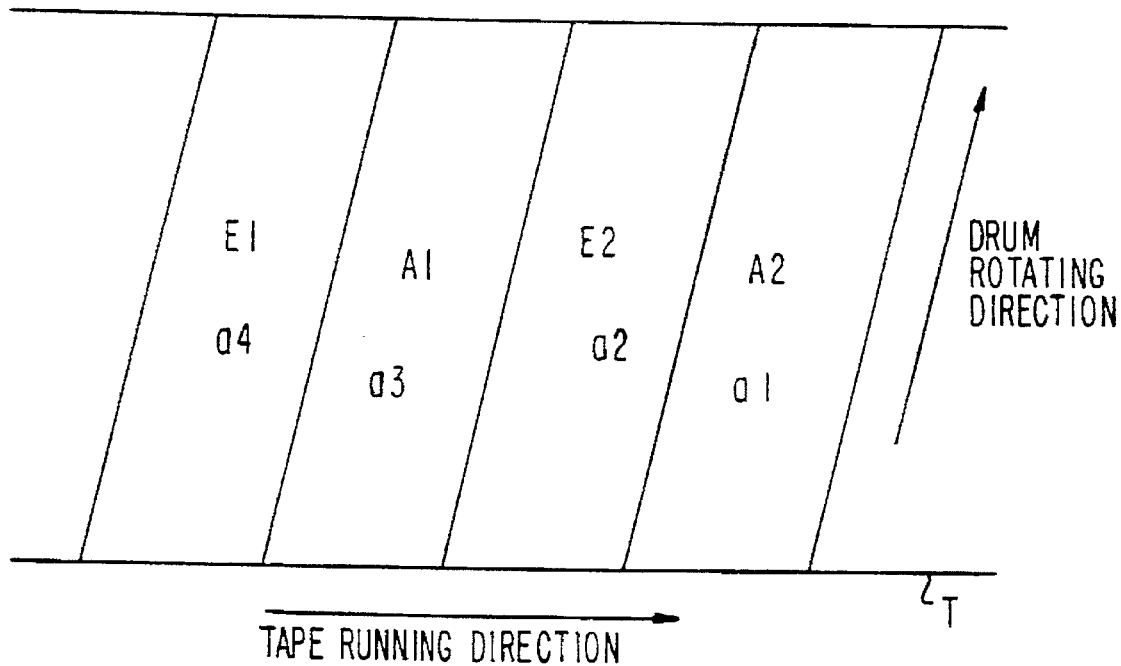
FIG. 18 illustrates a tape pattern in D2 mode.

In the D2 mode, the data a1, a3, b1, b3, . . . are recorded by the heads A1 and A2 with a timing shown in FIGS. 17(D) and 17(E) and data a4, b4, . . . are supplied to the head E1 with a timing shown in FIG. 17(F) and data a2, b2, . . . are supplied to the head E2 with the timing shown in FIG. 17(G). As a result, it is possible to record or reproduce two channels of the input digital signal ee corresponding to the third transfer rate, simultaneously. In the D2 mode, the track pattern becomes as shown in FIG. 18.

Figure 19:
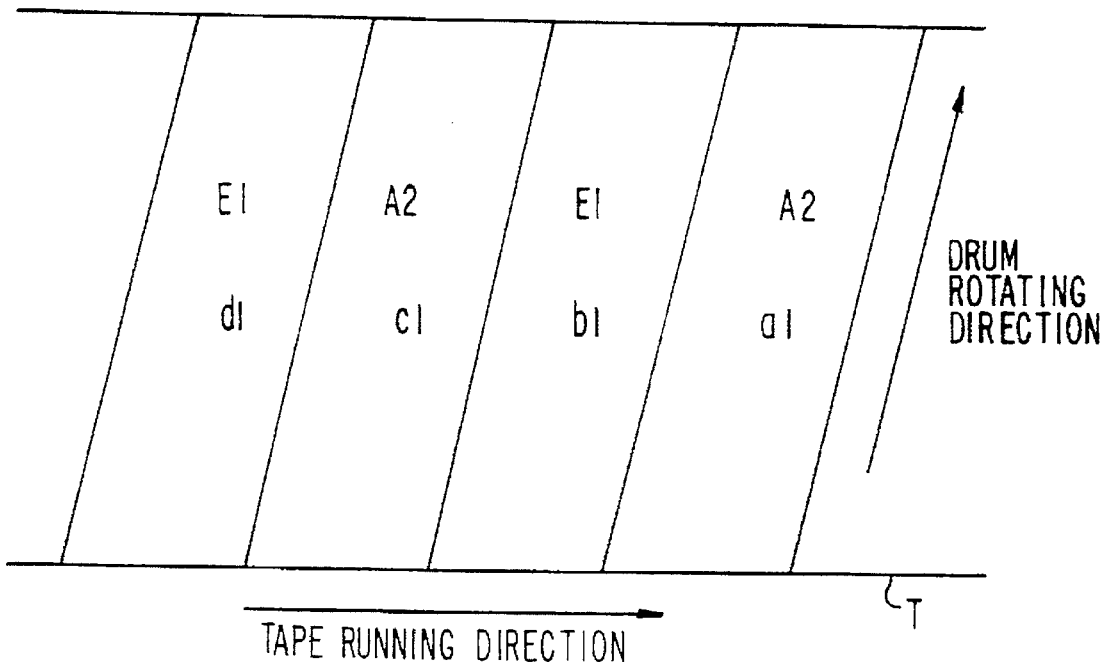
FIG. 19 illustrates a tape pattern in D3 mode.

In the D3 mode, the data a1, c1, . . . are supplied to the head A1 with a timing shown in FIG. 17(H) and the data b1, . . . are supplied to the head E2 with a timing shown in FIG. 17(I). As a result, it is possible to perform an interval recording or reproduction of an information which is one fourth of the information of the input digital signal ee, that is, a digital signal corresponding to the second transfer rate. In the D3 mode, the track pattern becomes as shown in FIG. 19.

The time axis of the digital signal in the D1, D2 or D3 mode can be modified and re-arranged under control of the control signal 8c from the control circuit 8.

As described, it is possible to realize the SP mode, the EP mode, D1 to D3 modes without adding any head on the rotary drum. Further, in the head construction described, the heads E1 and S2 are adjacent to each other and the heads E2 and S1 are adjacent to each other. Therefore, the reproducing operation at other speed than the standard speed can be done with good result.

Figure 20:
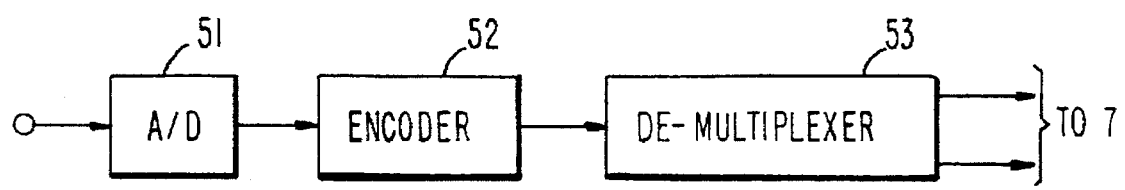
FIG. 20 is a block diagram showing another construction of the digital signal recording processor.
Figure 21:
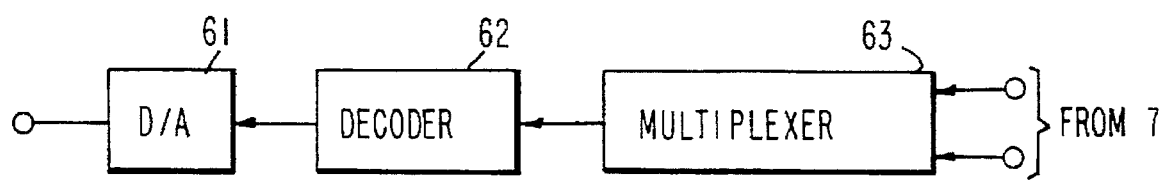
FIG. 21 is a block diagram showing another construction of the digital signal reproducing processor.

In a case where an analog video signal and an analog audio signal are input as digital signals to be recorded and reproduced in the D1, D2 or D3 mode, the digital signal recording processor 5 and the digital signal reproducing processor 6 may be constructed as shown in FIGS. 20 and 21, respectively. In FIG. 20, a reference numeral 51 depicts an A/D converter for converting the input analog video and audio signals into digital video and audio signals, 52 an encoder for processing the A/D converted signals to compression-code and scramble them and generate an error correction code and 53 a demultiplexer for supplying and distributing the digitized data to the heads in the manner shown in FIG. 17. In FIG. 21, a reference numeral 61 depicts a multiplexer for making signals reproduced by the respective heads to a continuous digitized data, 62 a decoder for performing a reverse processing to that of the encoder, that is, an error correction, descrambling and expansion of signals, and 61 a D/A converter for converting the digital signals from the decoder into analog video and audio signals.

In this embodiment, particularly, in the D2 mode, between tracks formed by a first pair of heads, other tracks are formed by a second pair of heads. Therefore, it is possible to perform not only over-write recording or reproduction but also a simultaneous 2 channel recording or reproduction without addition of any head. Further, in the simultaneous 2 channel recording or reproduction, there is no need of substantially increasing the rotation speed of the rotary drum. Therefore, it is possible to realize a stable magnetic tape running without using any special tension control device and thus it is possible to achieve a recording or reproduction with a simple circuit construction and without signal degradation.

Figure 22:
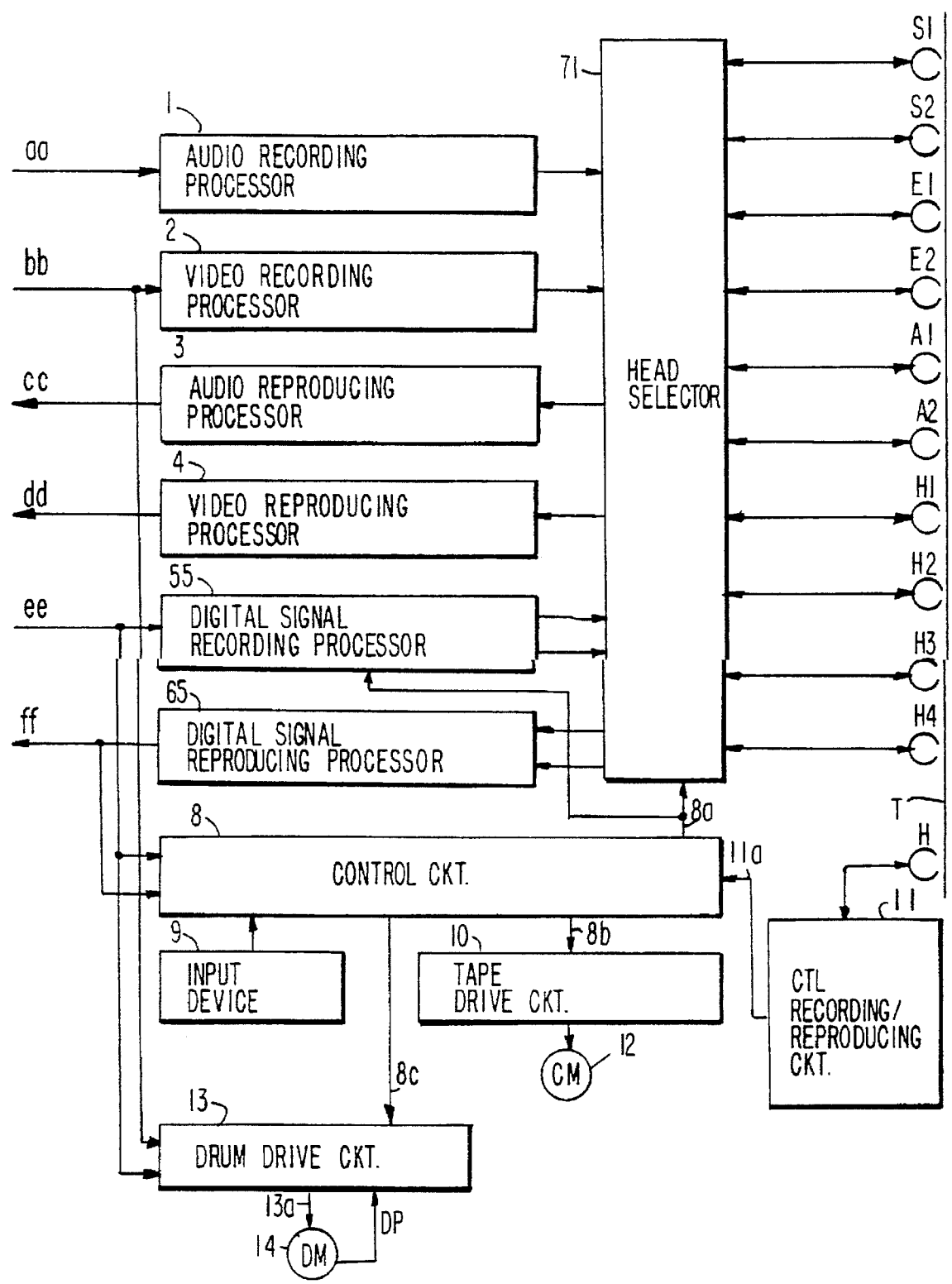
FIG. 22 shows a second embodiment of a helical scan type magnetic recording and reproducing apparatus according to the present invention.

Next, the magnetic recording and reproducing apparatus according to second embodiment of the present invention will now be described in detail with reference to FIG. 22 through FIG. 29. In FIG. 22, the heads H1, H2, H3 and H4 are used for recording and reproducing a digital signal exclusively. In the SP mode and the EP mode, this embodiment operates same as the first embodiment. In the D1, D2 or D3 mode, an input digital signal ee is supplied to a digital signal recording processor 55 and, after processed in the processor 55, supplied to the respective heads H1, H2, H3 and H4 through the head selector circuit 71 and recorded on the magnetic tape T. The recorded digital signal is reproduced by the heads H1, H2, H3 and H4 and supplied to the digital signal reproducing processor 65, resulting in an output digital signal ff.

Figure 23:
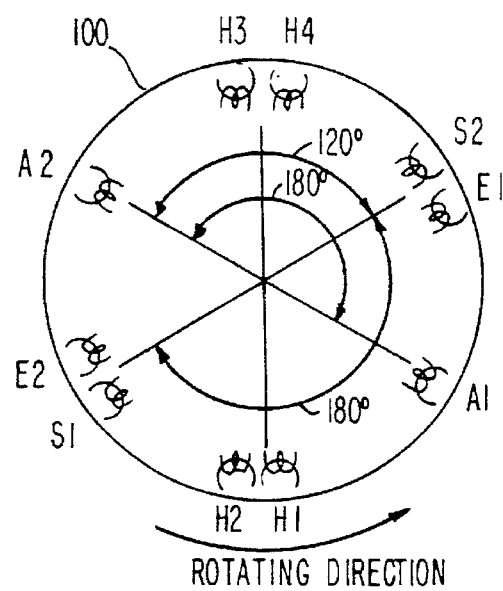
FIG. 23 shows a construction of a rotary drum.
Figure 24:
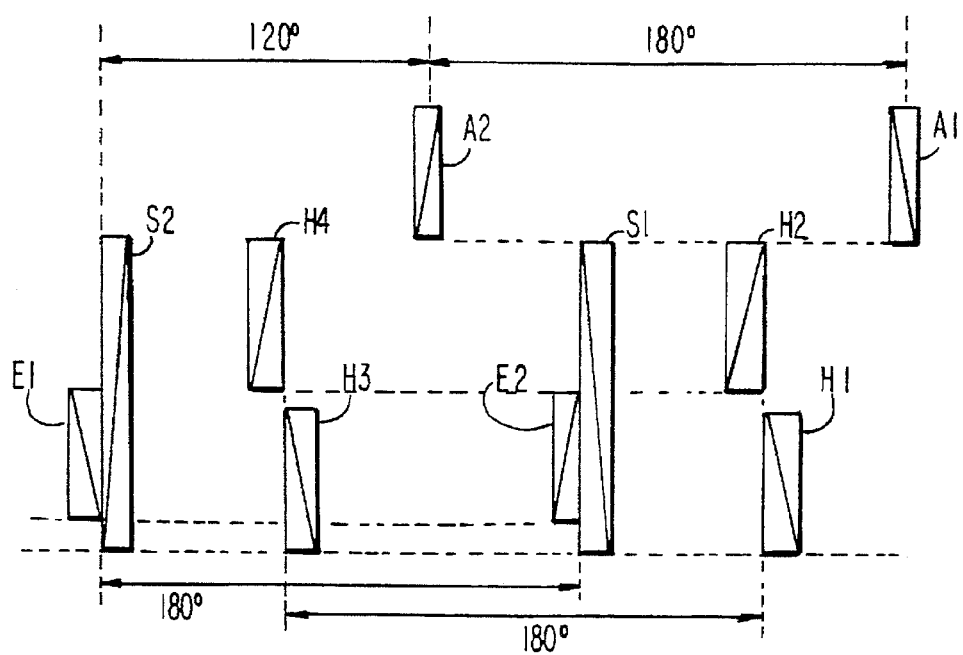
FIG. 24 is an illustration showing a mounting position of heads.

FIG. 23 shows a construction of the rotary drum and the heads used in the second embodiment, and FIG. 24 shows the mounting positions of the respective heads on the rotary drum. The heads H1 and H3 are mounted on the rotary drum in opposite positions about the axis of the drum and adjacent to the heads H2 and H4. Lower ends of the heads H2 and H4 are positioned in a level higher than a level of lower ends of the heads H1 and H3 by about 29 μm, respectively. The widths of the head H1 and H3 are shorter than 29 μm respectively.

Figure 26:
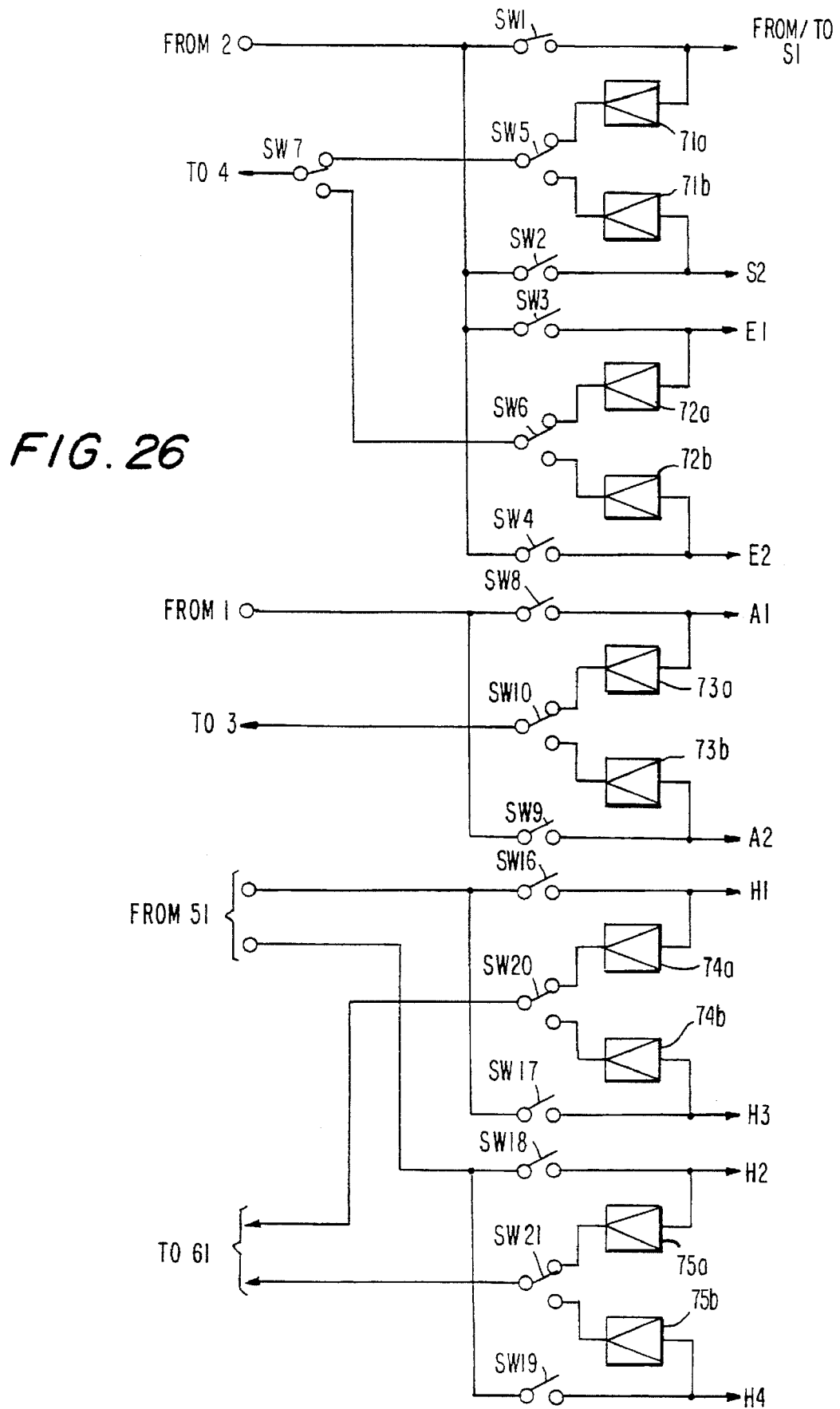
FIG. 26 is a block diagram showing a construction of the head selector circuit.

FIG. 25 illustrates an operation of the head selector circuit 71 and FIG. 26 is a block diagram of the head selector circuit 71. In the SP mode and EP mode, the analog video signal and the analog audio signal are recorded and produced by using the heads H1, H2, H3 and H4 same as the first embodiment. In the D1, D2 and D3 mode, the digital signal is recorded and reproduced by using the heads H1, H2, H3 and H4.

In the D1 mode, the digital signal is recorded or reproduced by selecting the heads H1 and H3 by turning switches SW16 and SW17 of the head selector circuit 71 on. In the D2 mode, the heads H1, H2, H3 and H4 are selected by turning the switches SW16, SW17, SW18 and SW19 of the head selector circuit 71 on, and a 2-channel simultaneous recording and reproducing operation of the digital signal is performed. In the D3 mode, interval recording and reproducing operation of the digital signal is performed by selecting the heads H1 by turning switche SW16 of the head selector circuit 71 on.

Figure 27:
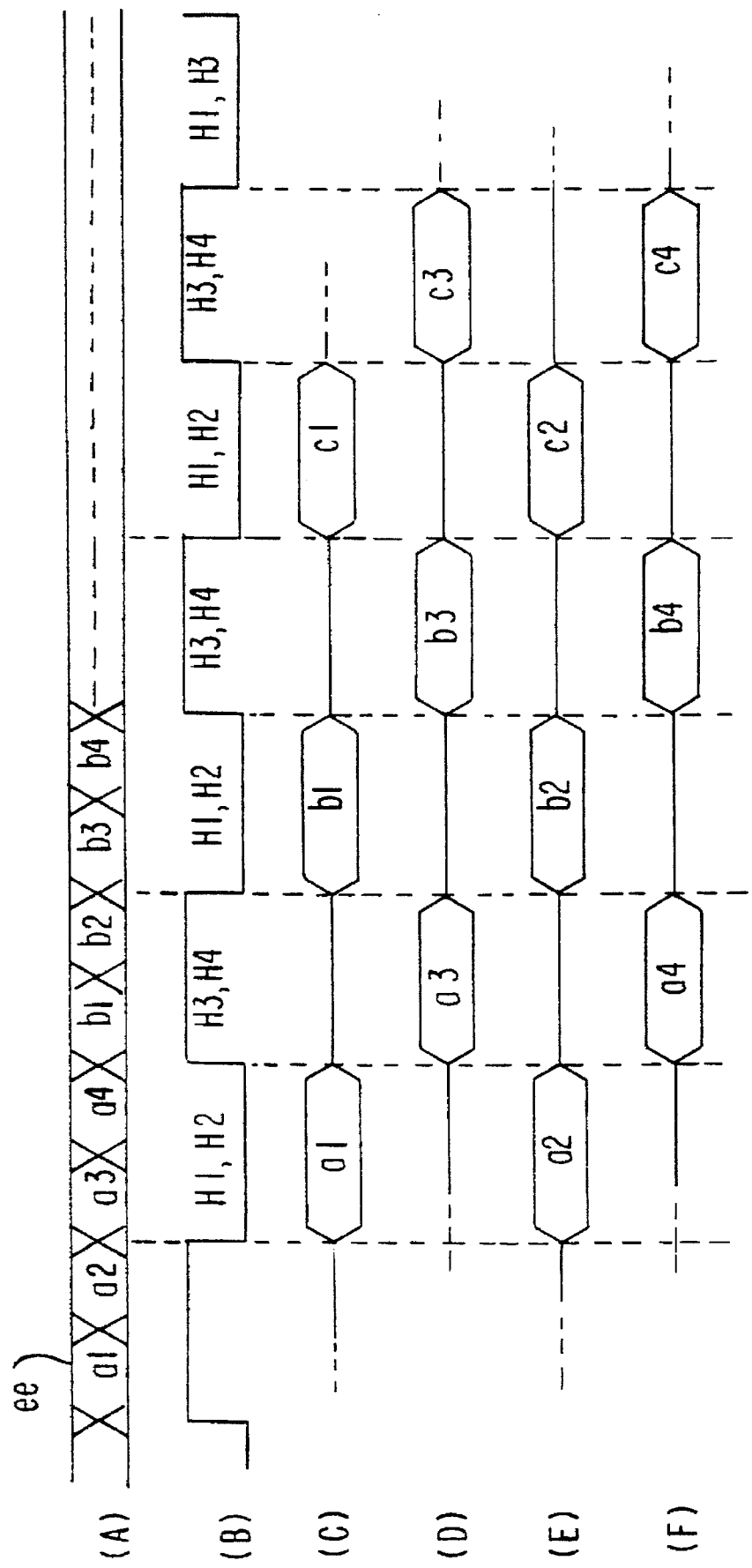
FIG. 27 is a timing chart showing an operation of a digital signal recording processing circuit.

Now, an operation of the digital signal recording processor 55 will be described with reference to FIG. 27 for a case when a digitized signal is input to the digital signal recording processor 55. FIG. 27(A) shows an input digital signal ee, and FIG. 27(B) shows a pulse signal synchronized with rotation of the heads H1, H2, H3 and H4. In a period in which the pulse is in low level, the head H1 and H2 are in contact with the magnetic tape T and, in a period in which the pulse is in high level, the head H3 and H4 are in contact with the magnetic tape T. The input digital signal ee shown in FIG. 27(A) has a third transfer rate which is twice the first transfer rate.

In the D1 mode, data a1, b1, . . . are supplied to the head H1 in the sequence timing shown in FIG. 27(C) and data a3, b3, . . . to the head H3 in the sequence timing shown in FIG. 27(D). As a result, it is possible to perform 1-channel recording or reproduction of an information which is a half of the information of the input digital signal ee, that is, a digital signal information corresponding to the first transfer rate.

Figure 28:
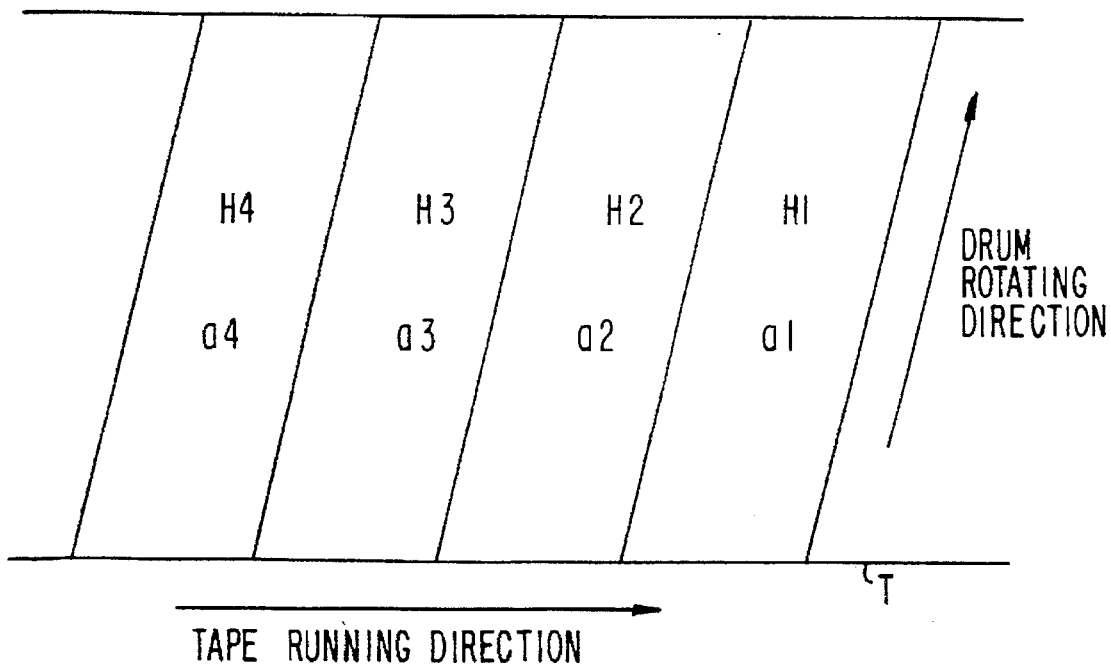
FIG. 28 illustrates a tape pattern in D2 mode.

In the D2 mode, the data a1, a3, b1, b3, . . . are recorded by the heads H1 and H3 with a timing shown in FIGS. 27(C) and 27(D), and data a2, b2, . . . are supplied to the head H2 with a timing shown in FIG. 27(E), and data a4, b4, . . . are supplied to the head H4 with the timing shown in FIG. 27(F). As a result, it is possible to record or reproduce two channels of the input digital signal ee corresponding to the third transfer rate, simultaneously. In the D2 mode, the track pattern becomes as shown in FIG. 28.

Figure 29:
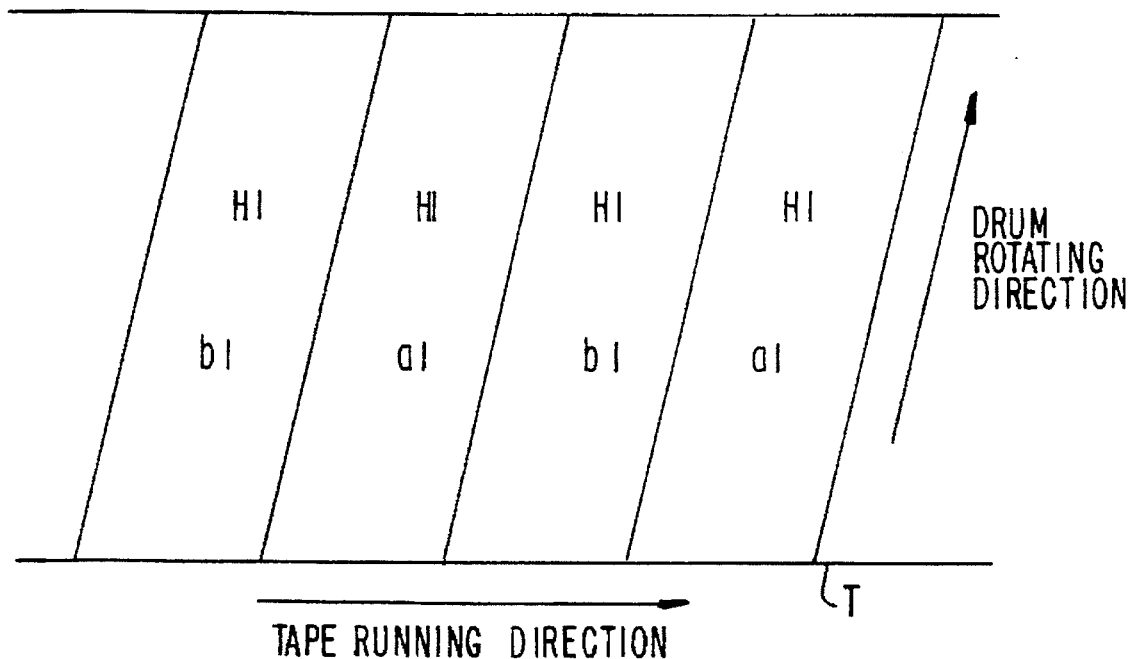
FIG. 29 illustrates a tape pattern in D3 mode.

In the D3 mode, the data a1, b1, c1, . . . are supplied to the head H1 with a timing shown in FIG. 27(C). As a result, it is possible to perform an interval recording or reproduction of an information which is one fourth of the information of the input digital signal ee, that is, a digital signal corresponding to the second transfer rate. In the D3 mode, the track pattern becomes as shown in FIG. 29.

What is claimed is:

1. A helical scan type magnetic recording and reproducing apparatus for recording a video signal on tracks formed on a magnetic tape obliquely with respect to a longitudinal direction of the magnetic tape wound on a rotary drum, comprising:

head means including a plurality of heads mounted on said rotary drum;

first recording and reproducing means for recording and reproducing a multiplexed signal containing a frequency modulated luminance signal and a low frequency converted chrominance signal of an analog video signal concerned with a television system of said video signal;

second recording and reproducing means for recording and reproducing a digital signal composed of a digital video signal concerned with said television system of said video signal;

selector means for supplying the multiplexed signal to said head means in a first mode in which the multiplexed signal is recorded and reproduced on and from said magnetic tape and for supplying the digital signal to said head means in a second mode in which the digital signal is recorded and reproduced on and from said magnetic tape; and drive means for driving said rotary drum at a first rotation speed at which said rotary drum is rotated once per frame of the analog video signal in the first mode and for driving said rotary drum at a second rotation speed at which said rotary drum is rotated at a speed 1.25 times or a speed 1.5 times the first rotation speed in the second mode.

2. A helical scan type magnetic recording and reproducing apparatus for recording a video signal and an audio signal on tracks formed on a magnetic tape obliquely with respect to a longitudinal direction of the magnetic tape wound on a rotary drum, comprising:

head means including a first head and a second head mounted on said rotary drum;

first recording and reproducing means for recording and reproducing a multiplexed signal containing a frequency modulated luminance signal and a low frequency converted chrominance signal of an analog video signal concerned with a television system of said video signal;

second recording and reproducing means for recording and reproducing a frequency modulated audio signal;

third recording and reproducing means for recording and reproducing a digital signal concerned with said television system of said video signal, said digital signal being composed of a digital video signal and a digital audio signal;

selector means for supplying the multiplexed signal to said first head and the audio signal to said second head in a first mode in which the multiplexed signal and the audio signal are recorded and reproduced on and from said magnetic tape and for supplying the digital signal to said first and second heads in a second mode in which the digital signal is recorded and reproduced on and from said magnetic tape; and drive means for driving said rotary drum at a first rotation speed at which said rotary drum is rotated once per frame of the analog video signal in the first mode and for driving said rotary drum at a second rotation speed at which said rotary drum is rotated at a speed 1.25 times the first rotation speed in the second mode.

3. A helical scan type magnetic recording and reproducing apparatus for recording a video signal and an audio signal on tracks formed on a magnetic tape obliquely with respect to a longitudinal direction of the magnetic tape wound on a rotary drum; comprising:

head means including a first head and a second head mounted on said rotary drum;

first recording and reproducing means for recording and reproducing a multiplexed signal containing a frequency modulated luminance signal and a low frequency converted chrominance signal of an analog video signal concerned with a television system of said video signal;

second recording and reproducing means for recording and reproducing a frequency modulated audio signal;

third recording and reproducing means for recording and reproducing a digital signal concerned with said television system of said video signal, said digital signal being composed of a digital video signal and a digital audio signal;

selector means for supplying the multiplexed signal to said first head and the audio signal to said second head in a first mode in which the multiplexed signal and the audio signal are recorded and reproduced on and from said magnetic tape and for supplying the digital signal to said first and second heads in a second mode in which the digital signal is recorded and reproduced on and from said magnetic tape; and drive means for driving said rotary drum at a first rotation speed at which said rotary drum is rotated once per frame of the analog video signal in the first mode and for driving said rotary drum at a second rotation speed at which said rotary drum is rotated at a speed 1.5 times the first rotation speed in the second mode.

4. A helical scan type magnetic recording and reproducing apparatus for recording a video signal and an audio signal on tracks formed on a magnetic tape obliquely with respect to a longitudinal direction of the magnetic tape wound on a rotary drum, comprising:

head means including a first head and a second head mounted on said rotary drum;

first recording and reproducing means for recording and reproducing a first multiplexed signal containing a frequency modulated luminance signal and a low frequency converted chrominance signal of a first analog video signal concerned with a first television system of said video signal;

second recording and reproducing means for recording and reproducing a second multiplexed signal containing a frequency modulated luminance signal and a low frequency converted chrominance signal of a second analog video signal concerned with a second television system of said video signal, said second analog video signal having a frame frequency different from the first analog signal;

third recording and reproducing means for recording and reproducing a frequency modulated audio signal;

fourth recording and reproducing means for recording and reproducing a first digital signal composed of a digital audio signal and a first digital video signal concerned with said first television system or a second digital signal composed of the digital audio signal and a second digital video signal concerned with said second television system, said second digital video signal having a frame frequency different from that of the first digital video signal;

selector means for supplying the first multiplexed signal to said first head and the audio signal to said second head in a first mode in which the first multiplexed signal and the audio signal are recorded and reproduced on and from said magnetic tape, for supplying the second multiplexed signal to said first head and the audio signal to said second head in a second mode in which the second multiplexed signal and the audio signal are recorded and reproduced on and from said magnetic tape, for supplying the first digital signal to said first and second heads in a third mode in which the first digital signal is recorded and reproduced on and from said magnetic tape and for supplying the second digital signal to said first and second heads in a fourth mode in which the second digital signal is recorded and reproduced on and from said magnetic tape; and drive means for driving said rotary drum at a first rotation speed at which said rotary drum is rotated once per frame of the first analog video signal in the first mode, for driving said rotary drum at a second rotation speed at which said rotary drum is rotated once per frame of the second analog video signal in the second mode, for driving said rotary drum at a third rotation speed at which said rotary drum is rotated at a speed 1.25 times the first rotation speed in the third mode and for driving said rotary drum at a third rotation speed at which said rotary drum is rotated at a speed 1.5 times the second rotation speed in the fourth mode.

5. The helical scan type magnetic recording and reproducing apparatus claimed in claim 2, wherein said drive means comprises:

first signal generator means for generating a first signal having a frequency 1.25 times the frequency of a first frame synchronization signal in synchronism with the first frame synchronization signal related to the digital video signal;

switch means for selectively outputting a second frame synchronization signal related to the analog video signal in the first mode and the first signal in the second mode; and synchronizing means for synchronizing an output of said switch means with a rotation phase of said rotary drum.

6. The helical scan type magnetic recording and reproducing apparatus claimed in claim 3, wherein said drive means comprises:

first signal generator means for generating a first signal having a frequency 1.5 times the frequency of a first frame synchronization signal in synchronism with the first frame synchronization signal related to the digital video signal;

switch means for selectively outputting a second frame synchronization signal related to the analog video signal in the first mode and the first signal in the second mode; and synchronizing means for synchronizing an output of the switch means with a rotation phase of said rotary drum.

7. The helical scan type magnetic recording and reproducing apparatus claimed in claim 4, wherein said drive means comprises:

first signal generator means for generating a first signal having a frequency 1.25 times the frequency of a first frame synchronization signal in synchronism with the first frame synchronization signal related to the digital video signal;

second signal generator means for generating a second signal having a frequency 1.5 times the frequency of a second frame synchronization signal in synchronism with the second frame synchronization signal related to the second digital video signal;

switch means for selectively outputting a third frame synchronization signal related to the first and second analog video signals in the first and second modes, the first signal in the third mode and the second signal in the fourth mode; and synchronizing means for synchronizing an output of the switch means with a rotation phase of said rotary drum.

8. The helical scan type magnetic recording and reproducing apparatus claimed in claim 2, wherein said third recording and reproducing means comprises a 2-channel transmission path and said selector means supplies the digital signal to said first and second heads in parallel through said 2-channel transmission path.

9. The helical scan type magnetic recording and reproducing apparatus claimed in claim 3, wherein said third recording and reproducing means comprises a 2-channel transmission path and said selector means supplies the digital signal to said first and second heads in parallel through said 2-channel transmission path.

10. The helical scan type magnetic recording and reproducing apparatus claimed in claim 4, wherein said fourth recording and reproducing means comprises a 2-channel transmission path for recording and reproducing the first and second digital signals and said selector means supplies the first and second digital signals to said first and second heads in parallel through said 2-channel transmission path in the third and fourth modes.

* * * * *